United States Patent
Pan et al.

(10) Patent No.: US 11,005,604 B2
(45) Date of Patent: May 11, 2021

(54) METHOD AND APPARATUS FOR HANDLING SIDELINK RECEPTION IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/525,977

(22) Filed: Jul. 30, 2019

(65) Prior Publication Data

US 2020/0099481 A1    Mar. 26, 2020

Related U.S. Application Data

(60) Provisional application No. 62/714,395, filed on Aug. 3, 2018.

(51) Int. Cl.
*H04L 1/18* (2006.01)
*H04W 76/15* (2018.01)
(Continued)

(52) U.S. Cl.
CPC ........... *H04L 1/1841* (2013.01); *H04W 28/04* (2013.01); *H04W 76/15* (2018.02); *H04W 80/02* (2013.01); *H04W 92/18* (2013.01)

(58) Field of Classification Search
CPC .... H04L 1/1841; H04W 76/15; H04W 28/04; H04W 80/02; H04W 92/18
See application file for complete search history.

(56) References Cited

U.S. PATENT DOCUMENTS

2015/0131578 A1*   5/2015   Baek ................. H04W 72/0406
                                                    370/329
2017/0181206 A1*   6/2017   Lee ....................... H04W 76/14
(Continued)

OTHER PUBLICATIONS

"3 Generation Partnership Project; Technical Specification Group Radio Access Network; Evolved Universal Terrestrial Radio Access (E-UTRA); Packet Data Convergence Protocol (PDCP) specification (Release 15)", Jul. 2018; 3GPP TS 36.323, Mobile Competence Centre; 650, Route Des Lucioles; F-06921, Sophia-Antipolis Cedes, France vol. RAN WG2, No. V15.0.0, 51 pgs.
(Continued)

*Primary Examiner* — Shukri Taha
(74) *Attorney, Agent, or Firm* — Cooper Legal Group, LLC

(57) ABSTRACT

A method and apparatus are disclosed. In an example from the perspective of a User Equipment (UE), if sidelink packet duplication is configured or enabled for a Sidelink Radio Bearer (SLRB), a first Packet Data Convergence Protocol (PDCP) Protocol Data Unit (PDU), corresponding to a first PDCP Service Data Unit (SDU), and a duplicate of the first PDCP PDU, are transmitted. A first PDCP Sequence Number (SN) of the first PDCP PDU is set based upon one or more state variables used for sidelink transmission on the SLRB. If the sidelink packet duplication is de-configured or disabled for the SLRB, a second PDCP PDU, corresponding to a second PDCP SDU, is transmitted. No duplicate of the second PDCP PDU is transmitted. A second PDCP SN of the second PDCP PDU is set based upon the one or more state variables used for sidelink transmission on the SLRB.

20 Claims, 15 Drawing Sheets

(51) Int. Cl.
    *H04W 28/04*  (2009.01)
    *H04W 80/02*  (2009.01)
    *H04W 92/18*  (2009.01)

(56) References Cited

U.S. PATENT DOCUMENTS

| | | | | |
|---|---|---|---|---|
| 2018/0309660 A1* | 10/2018 | Loehr | ............... | H04W 36/0066 |
| 2018/0310202 A1* | 10/2018 | Lohr | .................... | H04W 76/27 |
| 2018/0324641 A1 | 11/2018 | Tsai | | |
| 2018/0324642 A1* | 11/2018 | Yu | ......................... | H04W 76/15 |
| 2019/0098682 A1* | 3/2019 | Park | ................... | H04W 28/085 |
| 2019/0289489 A1* | 9/2019 | Yi | ..................... | H04W 28/0205 |
| 2020/0128596 A1* | 4/2020 | Yi | .......................... | H04L 1/189 |

OTHER PUBLICATIONS

"Introduction of eV2X in TS 36.331", May 2018, 3GPPTSG-RAN WG2 Meeting #102, R2-1808917, 3rd Generation Partnership Project (3GPP), Mobile Competence Centre; 650, Route Des Lucioles; F-06921 Sophia-Anti Pol, vol. RAN WG2, No. Busan, Korea; 80 pgs. Retrieved from the Internet:URL:http://www.3gpp•org/ftp/tsg%5Fran/WG2%5FRL2/TSGR2%5F102/Docs/R2%2D1808917%2Ezip.

Corresponding Japanese Patent Application No. 2019-139323, Office Action dated Aug. 4, 2020. English Translation.

"Discussion on PPPR Report in SidelinkUEInformation", ZTE, May 21-25, 2018, 3GPP TSG-RAN WG2 Meeting #102, Agenda Item 9.10.2.1, Busan, Korea.

"3rd Generation Partnership Project; Technical Specification Group Radio Access Network; Evolved Universal Terrestrial Radio Access (E-UTRA); Packet Data Convergence Protocol (PDCP) Specification (Release 15)", 3DPP TS 36.323 V 15.0.0, Jul. 2018, 3PP Support Office, 650 Route des Lucioles-Sophia ANtipolis, Valbonne, France.

"To Support Fairness Between Duplication and Non-Duplication in Mode 4", 3GPP TSG-RAN WG2 Meeting #102, LG Electronics Inc., May 21-25, 2018, Agenda Item 9.10.2.2, Busan, Korea.

Corresponding Korean Patent Application No. 10-2019-0092464, Office Action dated Nov. 5, 2020. English Translation.

* cited by examiner

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

FIG. 7

| Index | Size of Length field (in bits) |
|---|---|
| 0 | 7 |
| 1 | 15 |

FIG. 8

METHOD AND APPARATUS FOR HANDLING SIDELINK RECEPTION IN A WIRELESS COMMUNICATION SYSTEM

CROSS-REFERENCE TO RELATED APPLICATIONS

The present Application claims the benefit of U.S. Provisional Patent Application Ser. No. 62/714,395 filed on Aug. 3, 2018, the entire disclosure of which is incorporated herein in its entirety by reference.

FIELD

This disclosure generally relates to wireless communication networks, and more particularly, to a method and apparatus for handling sidelink reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), if sidelink packet duplication is configured or enabled for a Sidelink Radio Bearer (SLRB), a first Packet Data Convergence Protocol (PDCP) Protocol Data Unit (PDU), corresponding to a first PDCP Service Data Unit (SDU), and a duplicate of the first PDCP PDU, are transmitted. A first PDCP Sequence Number (SN) of the first PDCP PDU is set based upon one or more state variables used for sidelink transmission on the SLRB. If the sidelink packet duplication is de-configured or disabled for the SLRB, a second PDCP PDU, corresponding to a second PDCP SDU, is transmitted. No duplicate of the second PDCP PDU is transmitted. A second PDCP SN of the second PDCP PDU is set based upon the one or more state variables used for sidelink transmission on the SLRB.

BRIEF DESCRIPTION OF THE DRAWINGS

FIG. 7 illustrates a table comprising exemplary Logical Channel ID (LCID) values, associated with an LCID field, and exemplary indexes corresponding to the exemplary LCID values.

FIG. 8 illustrates a table comprising exemplary L field sizes (in bits) and exemplary indexes corresponding to the exemplary L field sizes.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based upon code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.300 v15.2.0, "Evolved Universal Terrestrial Radio Access (E-UTRA)", "Overall description", Stage 2; 3GPP TS 36.323 v15.0.0, "Evolved Universal Terrestrial Radio Access (E-UTRA)", "Packet Data Convergence Protocol (PDCP) specification"; 3GPP TS 36.321 v15.2.0, "Evolved Universal Terrestrial Radio Access (E-UTRA)", "Medium Access Control (MAC) protocol specification"; 3GPP TS 36.331 v15.2.2, "Evolved Universal Terrestrial Radio Access (E-UTRA)", "Radio Resource Control (RRC) protocol specification". The standards and documents listed above are hereby expressly incorporated by reference in their entirety.

Figure 1:
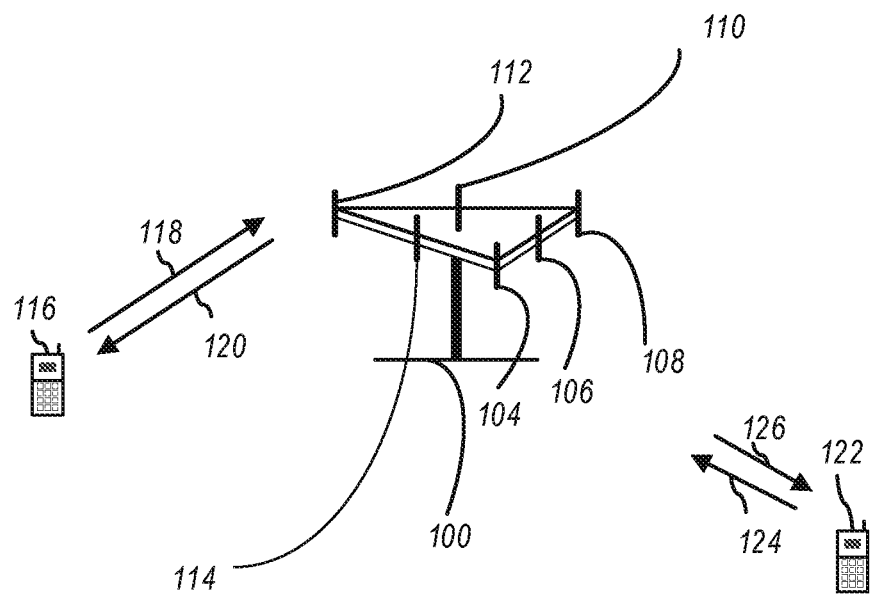
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
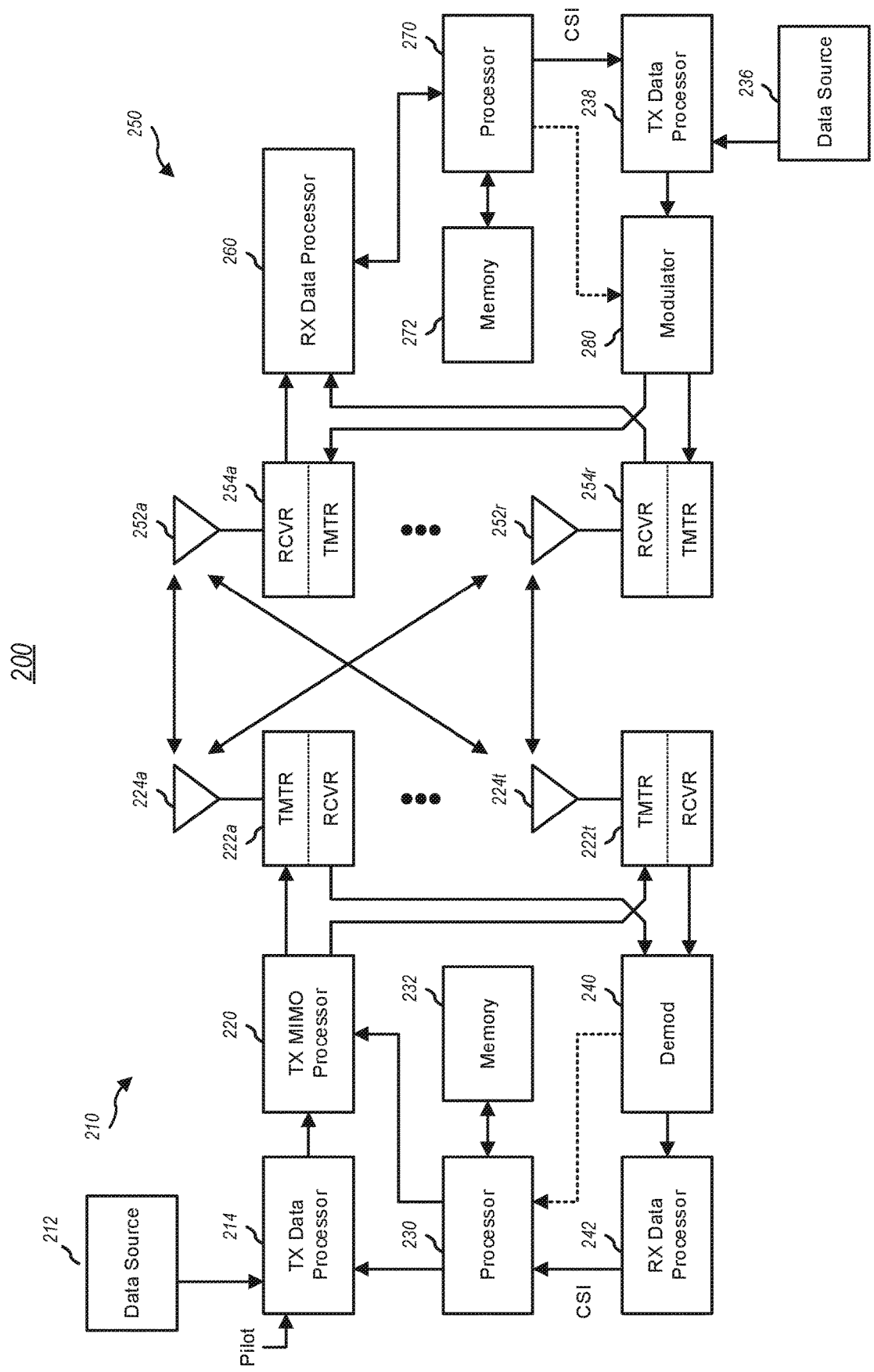
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based upon a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based upon a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further processe the samples to provide a corresponding "received" symbol stream.

An RX data processor 260 then receives and/or processes the $N_R$ received symbol streams from $N_R$ receivers 254 based upon a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
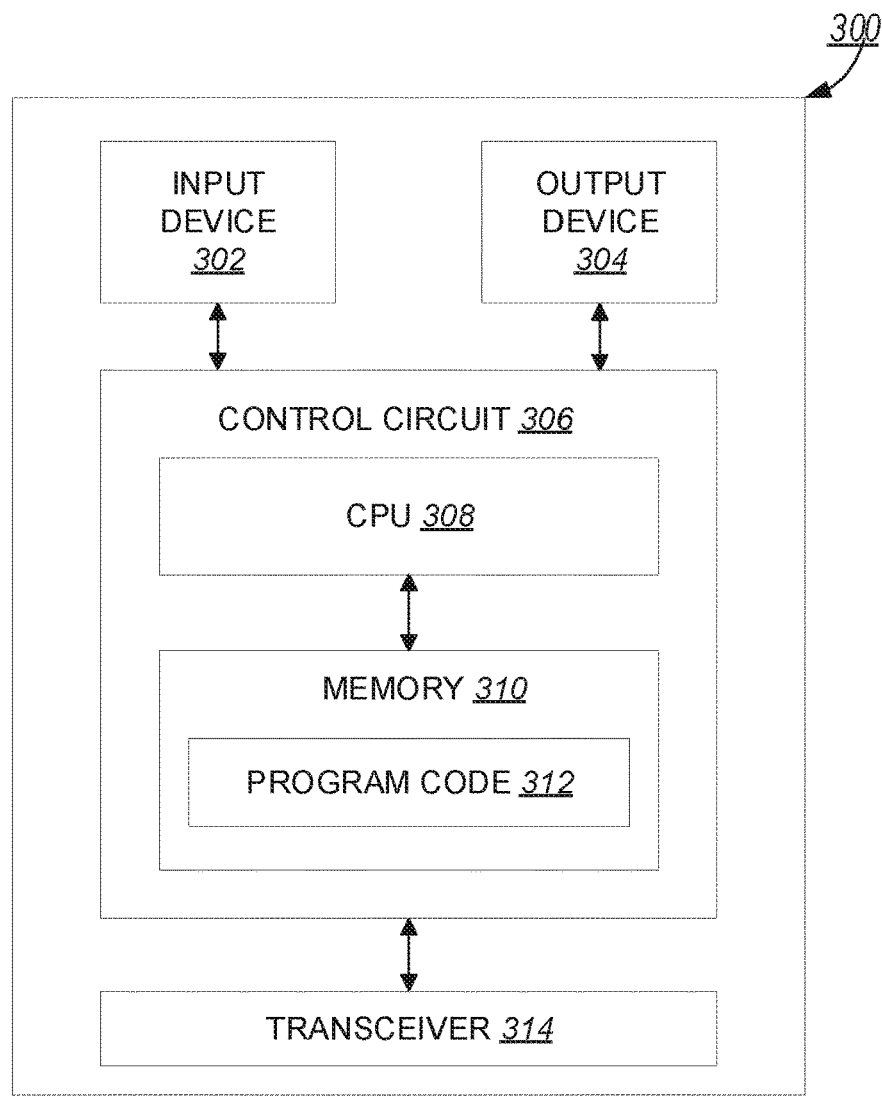
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
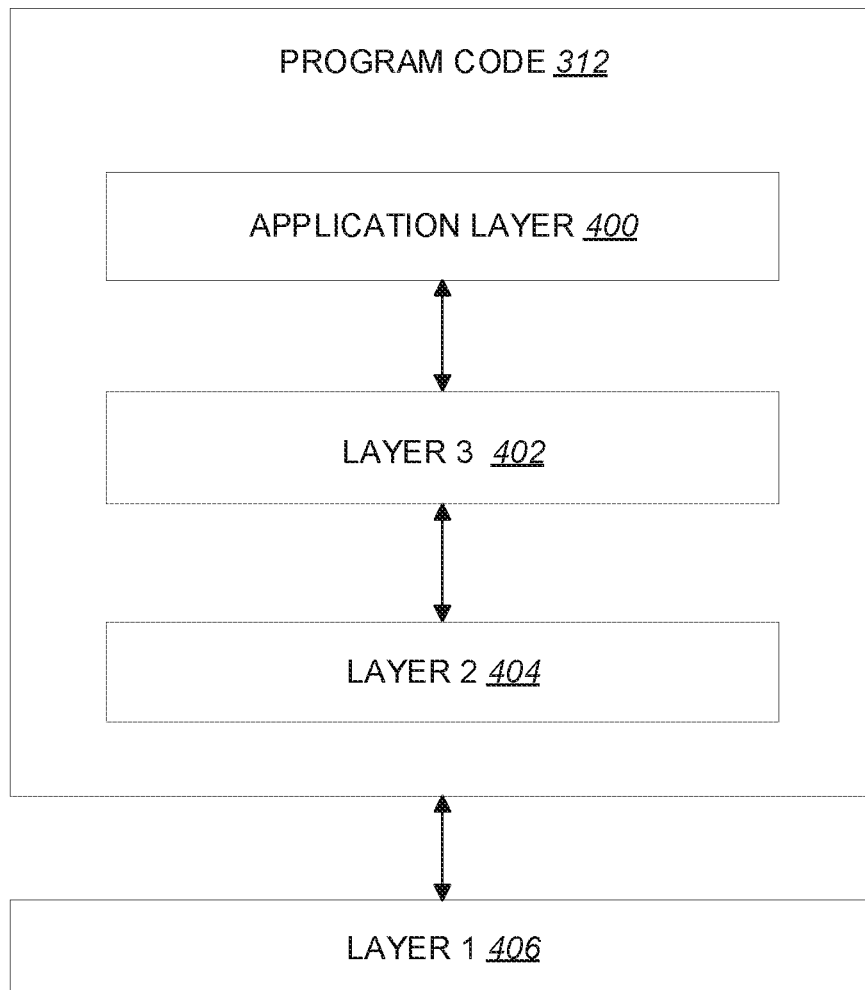
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS36.300 ("Evolved Universal Terrestrial Radio Access (E-UTRA) and Evolved Universal Terrestrial Radio Access Network (E-UTRAN)") describes related sidelink operation:

6 Layer 2

Layer 2 is split into the following sublayers: Medium Access Control (MAC), Radio Link Control (RLC) and Packet Data Convergence Protocol (PDCP).

This subclause gives a high level description of the Layer 2 sub-layers in terms of services and functions. The three figures below depict the PDCP/RLC/MAC architecture for downlink, uplink and Sidelink, where:

Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.

The multiplexing of several logical channels (i.e. radio bearers) on the same transport channel (i.e. transport block) is performed by the MAC sublayer;

In both uplink and downlink, when neither CA nor DC are configured, only one transport block is generated per TTI in the absence of spatial multiplexing;

In Sidelink, only one transport block is generated per TTI.

Figure 6:
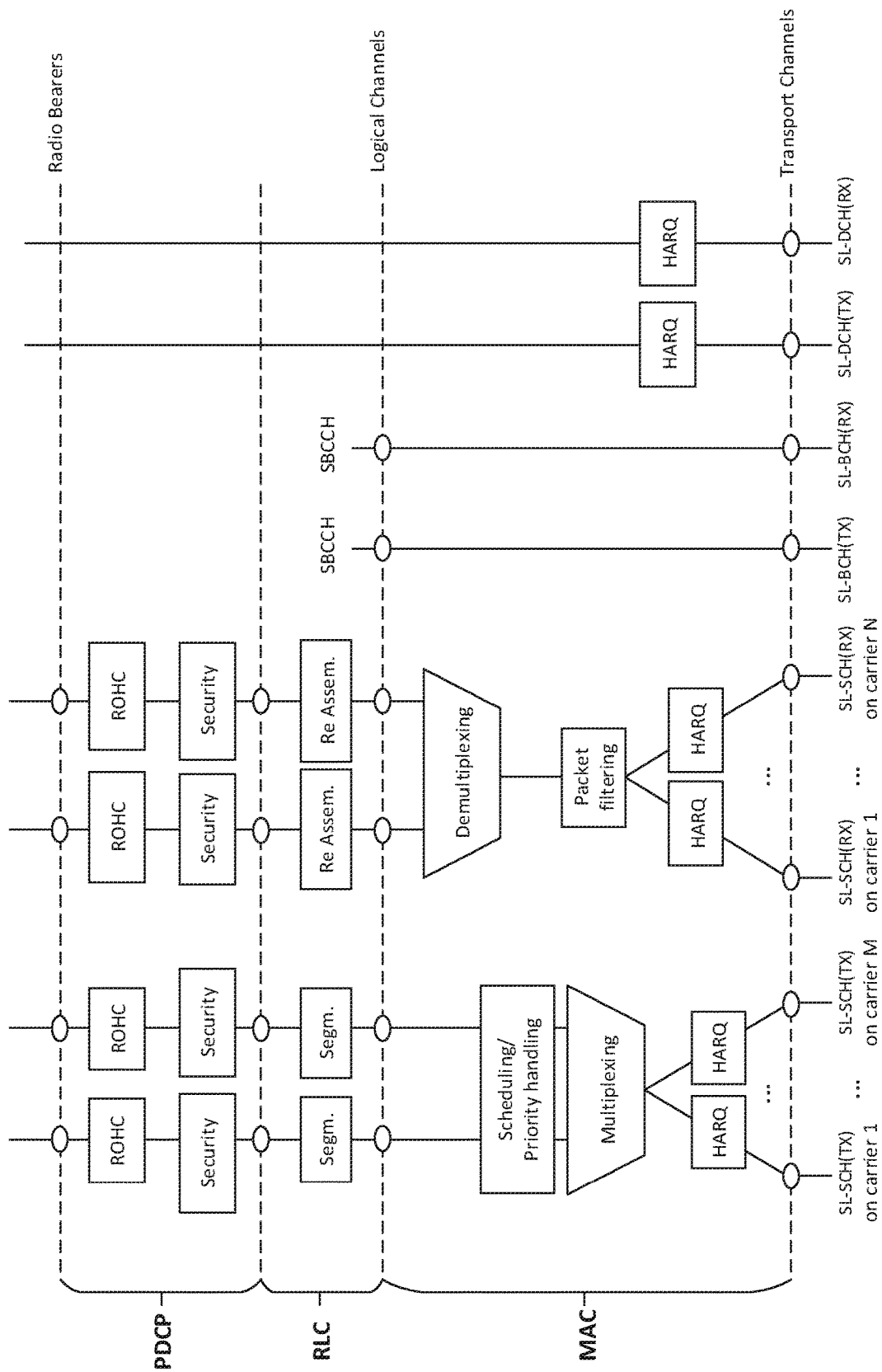
FIG. 6 illustrates an example architecture of a Layer 2 structure for sidelink operation where Carrier Aggregation (CA) is configured.

Notably, FIG. 6-1 of 3GPP TS 36.300 v 15.1.0, entitled "Layer 2 Structure for DL", is omitted.

Notably, FIG. 6-2 of 3GPP TS 36.300 v 15.1.0: entitled "Layer 2 Structure for UL" is omitted.

NOTE 1: The eNB may not be able to guarantee that a L2 buffer overflow will never occur. If such overflow occurs, UE may discard packets in the L2 buffer.

NOTE 2: For a NB-IoT UE that only supports Control Plane CIoT EPS optimizations, as defined in TS 24.301 [20], PDCP is bypassed. For a NB-IoT UE that supports Control Plane CIoT EPS optimization and S1-U data transfer or User Plane CIoT EPS optimization, as defined in TS 24.301 [20], PDCP is also bypassed (i.e. not used) until AS security is activated.

Figure 5:
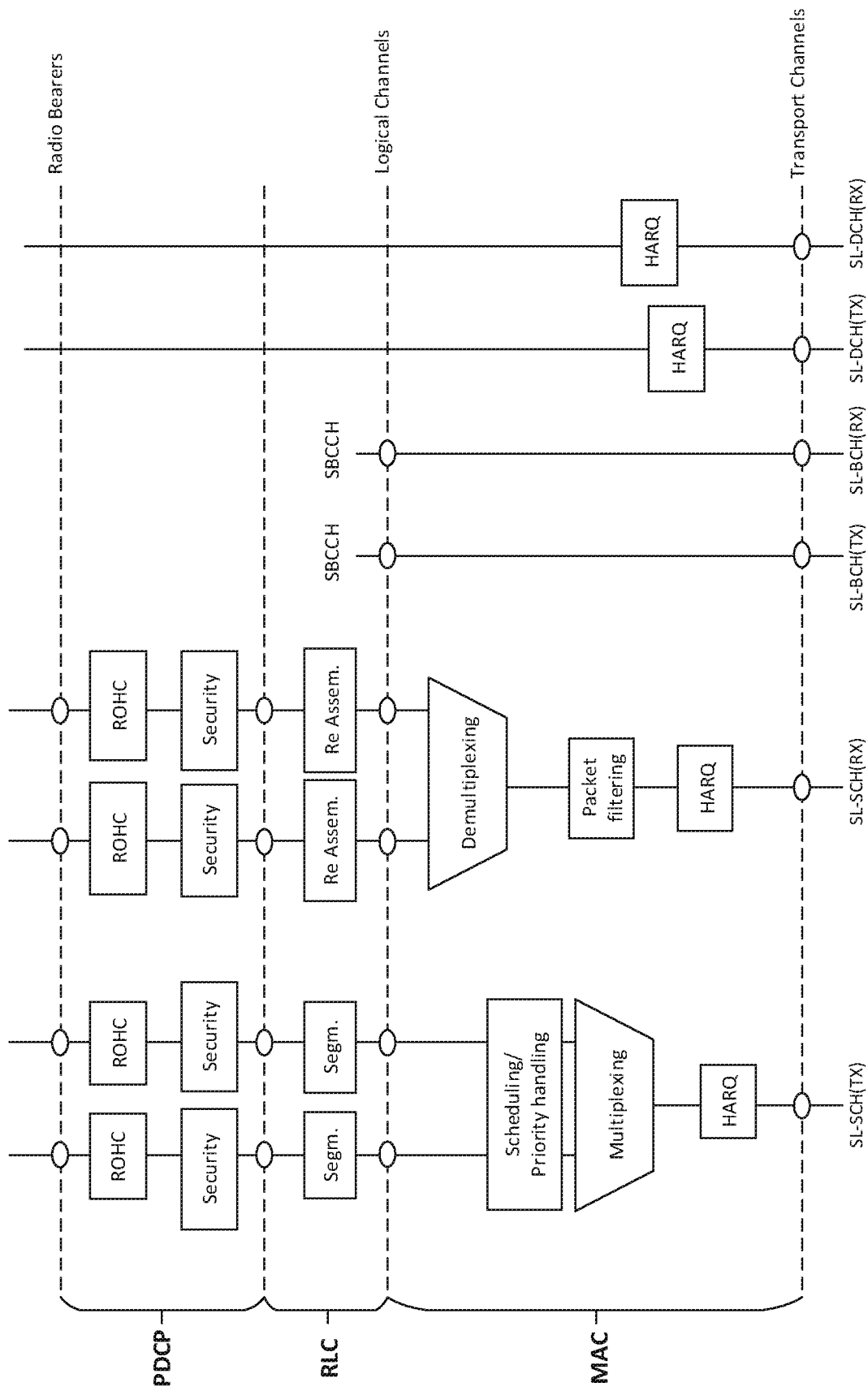
FIG. 5 illustrates an example architecture of a Layer 2 structure for sidelink operation.

[Notably, FIG. 6-3 of 3GPP TS 36.300 v 15.1.0, Entitled "Layer 2 Structure for Sidelink", is Reproduced Herein as FIG. 5.]

6.4 Carrier Aggregation

In case of CA in sidelink, which applies to V2X sidelink communication, there is one independent HARQ entity per carrier used for V2X sidelink communication and one transport block is generated per TTI per carrier. Each transport block and its potential HARQ retransmissions are mapped to a single carrier.

[Notably, FIGS. 6.4-3 of 3GPP TS 36.300 v 15.1.0, Entitled "Layer 2 Structure for Sidelink with CA Configured", is Reproduced Herein as FIG. 6.]

23.10 Support for sidelink communication 23.10.1 General

Sidelink communication is a mode of communication whereby UEs can communicate with each other directly over the PC5 interface [62]. This communication mode is supported when the UE is served by E-UTRAN and when the UE is outside of E-UTRA coverage. Only those UEs authorised to be used for public safety operation can perform sidelink communication.

In order to perform synchronisation for out of coverage operation UE(s) may act as a synchronisation source by transmitting SBCCH and a synchronisation signal. SBCCH carries the most essential system information needed to receive other sidelink channels and signals. SBCCH along with a synchronisation signal is transmitted with a fixed periodicity of 40 ms. When the UE is in network coverage, the contents of SBCCH are derived from the parameters signalled by the eNB. When the UE is out of coverage, if the UE selects another UE as a synchronisation reference, then the content of SBCCH is derived from the received SBCCH; otherwise UE uses pre-configured parameters. SIB18 provides the resource information for synchronisation signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronisation source based on defined criterion [16].

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:

Uu transmission/reception (highest priority);
PC5 sidelink communication transmission/reception;
PC5 sidelink discovery announcement/monitoring (lowest priority).

The UE performs transmission and reception over Uu and PC5 with the following decreasing priority order in case Sidelink Discovery Gap is configured:

Uu transmission/reception for RACH;
PC5 sidelink discovery announcement during a Sidelink Discovery Gap for transmission;
Non-RACH Uu transmission;
PC5 sidelink discovery monitoring during a Sidelink Discovery Gap for reception;
Non-RACH Uu reception;
PC5 sidelink communication transmission/reception.

23.10.2 Radio Protocol Architecture

In this subclause, the UE radio protocol architecture for sidelink communication is given for the user plane and the control plane.

23.10.2.1 User Plane

FIG. 23.10.2.1-1 shows the protocol stack for the user plane, where PDCP, RLC and MAC sublayers (terminate at the other UE) perform the functions listed for the user plane in subclause 6.

The Access Stratum protocol stack in the PC5 interface consists of PDCP, RLC, MAC and PHY as shown below in FIG. 23.10.2.1-1.

Notably, FIG. 23.10.2.1-1 of 3GPP TS 36.300 v 15.1.0, entitled "User-Plane protocol stack for sidelink communication", is omitted.

User plane details of sidelink communication:
There is no HARQ feedback for sidelink communication;
RLC UM is used for sidelink communication;
A receiving UE needs to maintain at least one RLC UM entity per transmitting peer UE;
A receiving RLC UM entity used for sidelink communication does not need to be configured prior to reception of the first RLC UMD PDU;
ROHC Unidirectional Mode is used for header compression in PDCP for sidelink communication;
UDC is not used for sidelink communication.
A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

23.10.2.2 Control plane

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 23.10.2.2-1.

Notably, FIG. 23.10.2.2-1 of 3GPP TS 36.300 v 15.1.0, entitled "Control-Plane protocol stack for SBCCH", is omitted.

The control plane for establishing, maintaining and releasing the logical connection for one-to-one sidelink communication is shown in FIG. 23.10.2.2-2.

Notably, FIG. 23.10.2.2-2 of 3GPP TS 36.300 v 15.1.0, entitled "Control-Plane protocol stack for one-to-one sidelink communication", is omitted.

23.14 Support for V2X Services
23.14.1 General

Vehicular communication services, represented by V2X services, can consist of the following four different types: V2V, V2I, V2N and V2P [71].

V2X services can be provided by PC5 interface and/or Uu interface. Support of V2X services via PC5 interface is provided by V2X sidelink communication, which is a mode of communication whereby UEs can communicate with each other directly over the PC5 interface [62]. This communication mode is supported when the UE is served by E-UTRAN and when the UE is outside of E-UTRA coverage. Only the UEs authorised to be used for V2X services can perform V2X sidelink communication.

23.14.1.1 Support for V2X Sidelink Communication

The user plane protocol stack and functions, as specified in subclause 23.10.2.1 for sidelink communication, are also used for V2X sidelink communication. In addition, for V2X sidelink communication:

STCH for sidelink communication is also used for V2X sidelink communication.

Non-V2X (e.g. Public Safety) data is not multiplexed with V2X data transmitted in resources configured for V2X sidelink communication.

The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value (3GPP TS 23.285 [72]).

The Access Stratum (AS) is provided with a transmit profile (3GPP TS 23.285 [72]) of a protocol data unit transmitted over PC5 interface by upper layers.

The logical channel prioritization based on PPPP is used for V2X sidelink communication.

Control plane protocol stack for SBCCH as specified in subclause 23.10.2.2 for sidelink communication is also used for V2X sidelink communication.

The UE supporting V2X sidelink communication can operate in two modes for resource allocation:

Scheduled resource allocation, characterized by:
  The UE needs to be RRC_CONNECTED in order to transmit data;
  The UE requests transmission resources from the eNB. The eNB schedules transmission resources for transmission of sidelink control information and data. Sidelink SPS is supported for scheduled resource allocation;

UE autonomous resource selection, characterized by:
  The UE on its own selects resources from resource pools and performs transport format selection to transmit sidelink control information and data;
  If mapping between the zones and V2X sidelink transmission resource pools is configured, the UE selects V2X sidelink resource pool based on the zone UE is located in.
  The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

In order to assist the eNB to provide sidelink resources, the UE in RRC_CONNECTED may report geographical location information to the eNB. The eNB can configure the UE to report the complete UE geographical location information based on periodic reporting via the existing measurement report signaling.

Geographical zones can be configured by the eNB or pre-configured. When zones are (pre)configured, the world is divided into geographical zones using a single fixed reference point (i.e. geographical coordinates (0, 0)), length and width. The UE determines the zone identity by means of modulo operation using length and width of each zone, number of zones in length, number of zones in width, the single fixed reference point and the geographical coordinates of the UE's current location. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB can provide the mapping between zone(s) and V2X sidelink transmission resource pools in RRC signalling. For out of coverage UEs, the mapping between the zone(s) and V2X sidelink transmission resource pools can be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell can be signaled in the handover command to reduce the transmission interruption. In this way, the UE may use the V2X sidelink transmission resource pools of the target cell before the handover is completed as long as either synchronization is performed with the target cell in case eNB is configured as synchronization source or synchronization is performed with GNSS in case GNSS is configured as synchronization source. If the exceptional transmission resource pool is included in the handover command, the UE uses randomly selected resources from the exceptional transmission resource pool, starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the sensing results on the transmission resource pools for autonomous resource selection are available. For exceptional cases (e.g. during RLF, during transition from RRC IDLE to RRC CONNECTED or during change of dedicated V2X sidelink resource pools within a cell), the UE may select resources in the exceptional pool provided in serving cell's SIB21 or in dedicated signalling based on random selection, and uses them temporarily. During cell reselection, the RRC_IDLE UE may use the randomly selected resources from the exceptional transmission resource pool of the reselected cell until the sensing results on the transmission resource pools for autonomous resource selection are available.

In order to avoid interruption time in receiving V2X messages due to delay in acquiring reception pools broadcasted from the target cell, synchronisation configuration and reception resource pool configuration for the target cell can be signaled to RRC_CONNECTED UEs in the handover command. For RRC_IDLE UE, it is up to UE implementation to minimize V2X sidelink transmission/reception interruption time associated with acquisition of SIB21 of the target cell.

A UE is considered in-coverage on the carrier used for V2X sidelink communication whenever it detects a cell on that carrier as per criteria specified in [16]. If the UE that is authorized for V2X sidelink communication is in-coverage on the frequency used for V2X sidelink communication or if the eNB provides V2X sidelink configuration for that frequency (including the case where UE is out of coverage on that frequency), the UE uses the scheduled resource allocation or UE autonomous resource selection as per eNB configuration. When the UE is out of coverage on the frequency used for V2X sidelink communication and if the eNB does not provide V2X sidelink configuration for that frequency, the UE may use a set of transmission and reception resource pools pre-configured in the UE. V2X sidelink communication resources are not shared with other non-V2X data transmitted over sidelink.

An RRC_CONNECTED UE may send a Sidelink UE Information message to the serving cell if it is interested in V2X sidelink communication transmission in order to request sidelink resources.

If the UE is configured by upper layers to receive V2X sidelink communication and V2X sidelink reception resource pools are provided, the UE receives on those provided resources.

Reception of V2X sidelink communication in different carriers/PLMNs can be supported by having multiple receiver chains in the UE.

For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not. Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre) configuration. The PPPR value(s) for which sidelink packet duplication is supported can be (pre)configured via a PPPR threshold. For UE autonomous resource selection and scheduled resource allocation, the UE shall perform sidelink packet duplication for the data with the configured PPPR value(s) until packet duplication is deconfigured for these PPPR value(s). For scheduled resource allocation, the UE reports the amount of data associated with one or more PPPR values, and the destination(s) to which the data belongs via sidelink BSR(s). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE.

For a UE using scheduled resource allocation, two non-overlapped sets of carriers are configured by the eNB per Destination reported by the UE to the network, and they apply to all the PPPR(s) that are configured for sidelink packet duplication. The UE then associates two duplicated sidelink logical channels corresponding to the same PDCP entity respectively with the two sets of carriers configured for the Destination of the two sidelink logical channels. The association between the duplicated sidelink logical channel and the carrier set is up to UE implementation. Data of a duplicated sidelink logical channel can only be transmitted on the carrier(s) in the associated carrier set.

For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively as specified in 3GPP TS 36.321 [13].

3GPP TS36.321 ("Evolved Universal Terrestrial Radio Access (E-UTRA); Medium Access Control (MAC) protocol specification") introduces the following:

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupinfoList [8]. LCG is defined per ProSe Destination.

A sidelink Buffer Status Report (BSR) shall be triggered if any of the following events occur:

- if the MAC entity has a configured SL-RNTI or a configured SL-V-RNTI:
  - SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";
  - UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";
  - retx-BSR-TimerSL expires and the MAC entity has data available for transmission for any of the sidelink logical channels, in which case the Sidelink BSR is referred below to as "Regular Sidelink BSR";
  - periodic-BSR-TimerSL expires, in which case the Sidelink BSR is referred below to as "Periodic Sidelink BSR";
- else:
  - An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:
- if the number of bits in the UL grant is equal to or larger than the size of a Sidelink BSR containing buffer status for all LCGs having data available for transmission plus its subheader:
  - report Sidelink BSR containing buffer status for all LCGs having data available for transmission;
- else report Truncated Sidelink BSR containing buffer status for as many LCGs having data available for transmission as possible, taking the number of bits in the UL grant into consideration.

For Padding Sidelink BSR:
- if the number of padding bits remaining after a Padding BSR has been triggered is equal to or larger than the size of a Sidelink BSR containing buffer status for all LCGs having data available for transmission plus its subheader:
  - report Sidelink BSR containing buffer status for all LCGs having data available for transmission;
- else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:
- if the MAC entity has UL resources allocated for new transmission for this TTI and the allocated UL resources can accommodate a Sidelink BSR MAC control element plus its subheader as a result of logical channel prioritization:
  - instruct the Multiplexing and Assembly procedure to generate the Sidelink BSR MAC control element(s);
  - start or restart periodic-BSR-TimerSL except when all the generated Sidelink BSRs are Truncated Sidelink BSRs;
  - start or restart retx-BSR-TimerSL;
- else if a Regular Sidelink BSR has been triggered:
  - if an uplink grant is not configured:
    - a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

6.2.4 MAC Header for SL-SCH

The MAC header is of variable size and consists of the following fields:
- V: The MAC PDU format version number field indicates which version of the SL-SCH subheader is used. In this version of the specification three format versions are defined, and this field shall therefore be set to "0001", "0010", and "0011". If the DST field is 24 bits this field shall be set to "0011". The V field size is 4 bits;
- SRC: The Source Layer-2 ID field carries the identity of the source. It is set to the ProSe UE ID. The SRC field size is 24 bits;
- DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers as defined in [14]. If the V field is set to "0001", this identifier is a groupcast identifier. If the V field is set to "0010", this identifier is a unicast identifier;
- LCID: The Logical Channel ID field uniquely identifies the logical channel instance within the scope of one Source Layer-2 ID and Destination Layer-2 ID pair of the corresponding MAC SDU or padding as described in table 6.2.4-1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The values of LCID from "01011" to "10100" identify the logical channels used to send duplicated RLC SDUs from logical channels of which the values of LCID from "00001" to "01010" respectively in sequential order. The LCID field size is 5 bits;
- L: The Length field indicates the length of the corresponding MAC SDU in bytes. There is one L field per MAC PDU subheader except for the last subheader. The size of the L field is indicated by the F field;
- F: The Format field indicates the size of the Length field as indicated in table 6.2.4-2. There is one F field per MAC PDU subheader except for the last subheader. The size of the F field is 1 bit. If the size of the MAC SDU is less than 128 bytes, the value of the F field is set to 0, otherwise it is set to 1;
- E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;
- R: Reserved bit, set to "0".

The MAC header and subheaders are octet aligned.

[Notably, Table 6.2.4-1 of 3GPP TS36.321, Entitled "Values of LCID for SL-SCH", is Reproduced Herein as FIG. 7.]
[Notably, Table 6.2.4-2 of 3GPP TS36.321, Entitled "Values of F Field", is Reproduced Herein as FIG. 8.]

3GPP TS36.323 introduces following:

5.1.1 UL Data Transfer Procedures

At reception of a PDCP SDU from upper layers, the UE shall:
  start the discardTimer associated with this PDCP SDU (if configured);

For a PDCP SDU received from upper layers, the UE shall:
  associate the PDCP SN corresponding to Next_PDCP_TX_SN to this PDCP SDU;
    NOTE: Associating more than half of the PDCP SN space of contiguous PDCP SDUs with PDCP SNs, when e.g., the PDCP SDUs are discarded or transmitted without acknowledgement, may cause HFN desynchronization problem. How to prevent HFN desynchronization problem is left up to UE implementation.
  perform header compression of the PDCP SDU (if configured) as specified in the subclause 5.5.4;
  perform compression of the uplink PDCP SDU (if configured) as specified in the subclause 5.11.4;
  perform integrity protection (if applicable), and ciphering (if applicable) using COUNT based on TX_HFN and the PDCP SN associated with this PDCP SDU as specified in the subclause 5.7 and 5.6, respectively;
  increment Next_PDCP_TX_SN by one;
  if Next_PDCP_TX_SN>Maximum_PDCP_SN:
    set Next_PDCP_TX_SN to 0;
    increment TX_HFN by one;
  if PDCP duplication is activated for the corresponding bearer:
    submit a duplicate of the resulting PDCP Data PDU to lower layer.
  submit the resulting PDCP Data PDU to lower layer.

5.1.2.1.3 Procedures for DRB s Mapped on RLC UM when the Reordering Function is not Used For DRBs mapped on RLC UM, at reception of a PDCP Data PDU from lower layers, the UE shall:
  if received PDCP SN<Next_PDCP_RX_SN:
    increment RX_HFN by one;
  decipher the PDCP Data PDU using COUNT based on RX_HFN and the received PDCP SN as specified in the subclause 5.6;
  set Next_PDCP_RX_SN to the received PDCP SN+1;
  if Next_PDCP_RX_SN>Maximum_PDCP_SN:
    set Next_PDCP_RX_SN to 0;
    increment RX_HFN by one;
  perform header decompression (if configured) of the deciphered PDCP Data PDU as specified in the subclause 5.5.5;
  deliver the resulting PDCP SDU to upper layer.

5.1.2.1.4 Procedures for DRB s Mapped on RLC AM or RLC UM, for LWA Bearers and SLRB when the Reordering Function is Used For DRBs mapped on RLC AM and RLC UM, for LWA bearers and when PDCP duplication is used, the PDCP entity shall use the reordering function as specified in this section when:
  the PDCP entity is associated with two RLC entities; or
  the PDCP entity is configured for a LWA bearer; or
  the PDCP entity is associated with one AM RLC entity after it was, according to the most recent reconfiguration, associated with two AM RLC entities or configured for a LWA bearer without performing PDCP re-establishment; or
  the PDCP entity is configured with PDCP duplication.

For SLRB s mapped on RLC UM, the PDCP entity shall use the reordering function as specified in this section when:
the PDCP entity is associated with two sidelink UM RLC entities.

The PDCP entity shall not use the reordering function in other cases.

5.1.2.1.4.1 Procedures when a PDCP PDU is Received from the Lower Layers

For DRBs mapped on RLC AM or RLC UM, SLRB for duplicated transmission and for LWA bearers, or for DRBs and SRBs when PDCP duplication is used, when the reordering function is used, at reception of a PDCP Data PDU from lower layers, the UE shall:
if received PDCP SN−Last_Submitted_PDCP_RX_SN>Reordering_Window or 0<=Last_Submitted_PDCP_RX_SN−received PDCP SN<Reordering_Window:
if the PDCP PDU was received on WLAN:
if received PDCP SN>Next_PDCP_RX_SN:
for the purpose of setting the HRW field in the LWA status report, use COUNT based on RX_HFN−1 and the received PDCP SN;
else:
for the purpose of setting the HRW field in the LWA status report, use COUNT based on RX_HFN and the received PDCP SN;
if received PDCP SN>Next_PDCP_RX_SN:
decipher the PDCP PDU as specified in the subclause 5.6, and perform integrity verification of the PDCP Data PDU (if applicable) using COUNT based on RX_HFN−1 and the received PDCP SN.
else:
decipher the PDCP PDU as specified in the subclause 5.6, and perform integrity verification of the PDCP Data PDU (if applicable) using COUNT based on RX_HFN and the received PDCP SN.
if integrity verification fails:
indicate the integrity verification failure to upper layer.
discard the PDCP PDU;
else if Next_PDCP_RX_SN−received PDCP SN>Reordering_Window:
increment RX_HFN by one;
use COUNT based on RX_HFN and the received PDCP SN for deciphering and integrity verification (if applicable) of the PDCP PDU;
set Next_PDCP_RX_SN to the received PDCP SN+1;
else if received PDCP SN−Next_PDCP_RX_SN>=Reordering_Window:
use COUNT based on RX_HFN−1 and the received PDCP SN for deciphering and integrity verification (if applicable) of the PDCP PDU.
else if received PDCP SN>=Next_PDCP_RX_SN:
use COUNT based on RX_HFN and the received PDCP SN for deciphering and integrity verification (if applicable) of the PDCP PDU;
set Next_PDCP_RX_SN to the received PDCP SN+1;
if Next_PDCP_RX_SN is larger than Maximum_PDCP_SN:
set Next_PDCP_RX_SN to 0;
increment RX_HFN by one.
else if received PDCP SN<Next_PDCP_RX_SN:
use COUNT based on RX_HFN and the received PDCP SN for deciphering and integrity verification of the PDCP PDU;
if the PDCP PDU has not been discarded in the above:
if a PDCP SDU with the same PDCP SN is stored:
perform deciphering and integrity verification (if applicable) of the PDCP PDU;
if integrity verification fails:
indicate the integrity verification failure to upper layer.
discard the PDCP PDU;
else:
perform deciphering and integrity verification (if applicable) of the PDCP PDU and store the resulting PDCP SDU;
if integrity verification fails:
indicate the integrity verification failure to upper layer;
discard the PDCP Data PDU.
if the PDCP PDU has not been discarded in the above:
if received PDCP SN=Last_Submitted_PDCP_RX_SN+1 or received PDCP SN=Last_Submitted_PDCP_RX_SN−Maximum_PDCP_SN:
deliver to upper layers in ascending order of the associated COUNT value:
all stored PDCP SDU(s) with consecutively associated COUNT value(s) starting from the COUNT value associated with the received PDCP PDU;
set Last_Submitted_PDCP_RX_SN to the PDCP SN of the last PDCP SDU delivered to upper layers;
if t-Reordering is running:
if the PDCP SDU with Reordering_PDCP_RX_COUNT−1 has been delivered to upper layers:
stop and reset t-Reordering;
if t-Reordering is not running (includes the case when t-Reordering is stopped due to actions above):
if there is at least one stored PDCP SDU:
start t-Reordering;
set Reordering_PDCP_RX_COUNT to the COUNT value associated to RX_HFN and Next_PDCP_RX_SN.

5.1.2.1.4.2 Procedures when t-Reordering Expires
When t-Reordering expires, the UE shall:
deliver to upper layers in ascending order of the associated COUNT value:
all stored PDCP SDU(s) with associated COUNT value(s) less than Reordering_PDCP_RX_COUNT;
all stored PDCP SDU(s) with consecutively associated COUNT value(s) starting from Reordering_PDCP_RX_COUNT;
set Last_Submitted_PDCP_RX_SN to the PDCP SN of the last PDCP SDU delivered to upper layers;
if there is at least one stored PDCP SDU:
start t-Reordering;
set Reordering_PDCP_RX_COUNT to the COUNT value associated to RX_HFN and Next_PDCP_RX_SN.

5.1.2.1.4.3 Procedures when the Value of t-Reordering is Reconfigured
When the value of the t-Reordering is reconfigured by upper layers while the t-Reordering is running, the UE shall:
stop and restart t-Reordering;
set Reordering_PDCP_RX_COUNT to the COUNT value associated to RX_HFN and Next_PDCP_RX_SN.

5.1.3 SL Data Transmission Procedures
For Sidelink transmission, the UE shall follow the procedures in subclause 5.1.1 with following modifications:

the requirements for maintaining Next_PDCP_TX_SN and TX_HFN are not applicable;

determine a PDCP SN ensuring that a PDCP SN value is not reused with the same key;

perform ciphering (if configured) as specified in subclause 5.6.1 and 5.6.2;

perform the header compression (if configured) if SDU Type is set to 000, i.e. IP SDUs.

For sidelink duplication transmission capable UE, when PDCP duplication transmission is configured, for the SLRB with packets which have PPPR no lower than the configured PPPR threshold, the Sidelink transmission of UE shall follow the procedures in subclause 5.1.1 with following modifications compared to above Sidelink transmission procedure:

the requirements for maintaining Next_PDCP_TX_SN and TX_HFN are applicable;

the PDCP entity duplicates the PDCP PDUs, and delivers the PDCP PDUs to both RLC entities for transmission.

5.1.4 SL Data Reception Procedures

For Sidelink reception, the UE shall follow the procedures in subclause 5.1.2.1.3 with following modifications:

the requirements for maintaining Next_PDCP_RX_SN and RX_HFN are not applicable;

perform the deciphering (if configured) as specified in subclause 5.6.1 and 5.6.2;

perform the header decompression (if configured) if SDU Type is set to 000, i.e. IP SDUs.

For sidelink duplication reception capable UE, if it detects PDCP duplication reception in duplication logical channel, or if it receives a PDCP SN which is not "0" from the non-duplication logical channel, the Sidelink reception of the UE shall follow the procedures in subclause 5.1.2.1.4.1 with following modifications compared to above Sidelink reception procedure:

the requirements for maintaining Next_PDCP_RX_SN and RX_HFN are applicable; perform the re-ordering procedure as specified in subclause 5.1.2.1.4.1.

5.6.1 SL Ciphering and Deciphering for One-to-Many Communication

For SLRB used for one-to-many communication, the ciphering function includes both ciphering and deciphering and is performed in PDCP as defined in [13]. The data unit that is ciphered is the data part of the PDCP PDU (see subclause 6.3.3). The ciphering function as specified in [6] is applied with KEY (PEK), COUNT (derived from PTK Identity and PDCP SN as specified in [13]), BEARER and DIRECTION (set to 0) as input. The ciphering function is configured by ProSe Function.

If ciphering is configured, the ciphering algorithm and related parameters including PGK, PGK Identity, and Group Member Identity are configured to the UE by ProSe Key Management Function. The UE shall set PTK Identity based on PGK, PGK Identity, and PDCP SN as specified in [13]. The UE shall derive PTK from PGK using PTK Identity and Group Member Identity, and derive PEK from PTK using the ciphering algorithm. The PGK Index, PTK Identity, and PDCP SN are included in the PDCP PDU header.

If ciphering is not configured, PGK Index and PTK Identity shall be set to "0" in the PDCP PDU header.

If ciphering is not configured, and sidelink duplication transmission is disabled for the SLRB, PDCP SN shall be set to "0" in the PDCP PDU header.

5.6.2 SL Ciphering and Deciphering for One-to-One Communication

For SLRB used for one-to-one communication, the ciphering function includes both ciphering and deciphering and is performed in PDCP of SLRB that needs ciphering and deciphering as defined in [13]. The data unit that is ciphered is the data part of the PDCP PDU (see subclause 6.3.3). The ciphering function as specified in [6] is applied with KEY (PEK), COUNT (derived from $K_{D\text{-}sess}$ Identity and PDCP SN as specified in [13]), BEARER and DIRECTION (which value shall be set is specified in [13]) as input.

For the SLRB that needs ciphering and deciphering, the UE shall derive the KEY (PEK) based on $K_{D\text{-}sess}$ and the algorithms determined by the initiating UE and the receiving UE as specified in [13]. The $K_{D\text{-}sess}$ Identity and PDCP SN are included in the PDCP PDU header.

For the SLRB that does not need ciphering and deciphering, the UE shall set $K_{D\text{-}sess}$ Identity to "0" in the PDCP PDU header.

For the SLRB that does not need ciphering and deciphering, and sidelink duplication transmission is disabled, PDCP SN shall be set "0" in the PDCP PDU header.

7.1 State Variables

This sub clause describes the state variables used in PDCP entities in order to specify the PDCP protocol.

All state variables are non-negative integers.

The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN

The variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0.

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

The variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

f) Reordering_PDCP_RX_COUNT

This variable is used only when the reordering function is used. This variable holds the value of the COUNT following the COUNT value associated with the PDCP PDU which triggered t-Reordering.

3GPP TS36.331 introduces following:

6.3.1 System information blocks

SystemInformationBlockType22

The IE SystemInformationBlockType22 contains V2X sidelink communication configurations which can be used jointly with those included in SystemInformationBlockType21.

| SystemInformationBlockType22 information element |
| --- |

```
ASN1START
SystemInformationBlockType22-r15    ::= SEQUENCE {
    v2x-InterFreqInfoList-r15           SL-InterFreqInfoListV2X-r14         OPTIONAL,   -- Need OR
    cbr-pssch-TxConfigList-r15          SL-CBR-PPPP-TxConfigList-r15        OPTIONAL,   -- Need OR
    v2x-PacketDuplicationConfig-r15     SL-V2X-PacketDuplicationConfig-r15  OPTIONAL,   -- Need OR
    syncFreqList-r15                    SL-V2X-SyncFreqList-r15             OPTIONAL,   -- Need OR
    slss-TxMultiFreq-r15                ENUMERATED{true}                    OPTIONAL,   -- Need OR
    v2x-FreqSelectionConfigList-r15     SL-V2X-FreqSelectionConfigList-r15  OPTIONAL    -- Need OR
    ...
}
-- ASN1STOP
```

| SystemInformationBlockType22 field descriptions |
| --- |
| cbr-pssch-TxConfigList<br>Indicates the mapping between PPPPs, CBR ranges by using indexes of the entry in cbr-RangeCommonConfigList included in SIB21, and PSSCH transmission parameters and CR limit by using indexes of the entry in sl-CBR-PSSCH-TxConfigList included in SIB21. The configurations in this field apply to all the resource pools on all the carrier frequencies included in SIB22 for V2X sidelink communication transmission.<br>slss-TxMultiFreq<br>Value TRUE indicates the UE transmits SLSS on multiple carrier frequencies for V2X sidelink communication. If this field is absent, the UE transmits SLSS only on the synchronisation carrier frequency.<br>syncFreqList<br>Indicates a list of candidate carrier frequencies that can be used for the synchronisation of V2X sidelink communication. |

-continued

| SystemInformationBlockType22 field descriptions |
| --- |
| v2x-FreqSelectionConfigList<br>Indicates the configuration information for the carrier selection for V2X sidelink communication transmission on the carrier frequency where the field is broadcast.<br>v2x-PacketDuplicationConfig<br>Indicates the configuration information for sidelink packet duplication for V2X sidelink communication.<br>v2x-InterFreqInfoList<br>If this field includes a carrier frequency which is included in SIB21 and some configuration(s) for that carrier are already included in SIB21, the corresponding configuration(s) for that carrier frequency are not included in this field. |

6.3.8 Sidelink Information Elements
SL-V2X-ConfigDedicated
    The IE SL-V2X-ConfigDedicated specifies the dedicated configuration information for V2X sidelink communication.

| SL-V2X-ConfigDedicated information element |
| --- |

```
ASN1START
SL-V2X-ConfigDedicated-r14 ::=              SEQUENCE {
    commTxResources-r14                         CHOICE {
        release                                     NULL,
        setup                                       CHOICE {
            scheduled-r14                               SEQUENCE {
                sl-V-RNTI-r14                   C-RNTI,
                mac-MainConfig-r14                      MAC-MainConfigSL-r12,
                v2x-SchedulingPool-r14                  SL-CommResourcePoolV2X-r14  OPTIONAL,   -- Need ON
                mcs-r14                                 INTEGER (0..31)             OPTIONAL,   -- Need OR
                logicalChGroupInfoList-r14              LogicalChGroupInfoList-r13
            },
            ue-Selected-r14                             SEQUENCE {
                Pool for normal usage
                v2x-CommTxPoolNormalDedicated-r14           SEQUENCE {
                    poolToReleaseList-r14                       SL-TxPoolToReleaseListV2X-r14   OPTIONAL,   -- Need ON
                    poolToAddModList-r14                        SL-TxPoolToAddModListV2X-r14    OPTIONAL,   -- Need ON
                    v2x-CommTxPoolSensingConfig-r14             SL-CommTxPoolSensingConfig-r14
                    OPTIONAL    -- Need ON
                }
            }
        }
    }                                                                                   OPTIONAL,   -- Need ON
    v2x-InterFreqInfoList-r14                   SL-InterFreqInfoListV2X-r14             OPTIONAL,   -- Need ON
    thresSL-TxPrioritization-r14                SL-Priority-r13                         OPTIONAL,   -- Need OR
    typeTxSync-r14                              SL-TypeTxSync-r14                       OPTIONAL,   -- Need OR
    cbr-DedicatedTxConfigList-r14               SL-CBR-CommonTxConfigList-r14           OPTIONAL,   -- Need OR
    ...,
    [[ commTxResources-v15x0                        CHOICE {
        release                                         NULL,
        setup                                           CHOICE {
            scheduled-v15x0                                 SEQUENCE {
                logicalChGroupInfoList-v15x0                    LogicalChGroupInfoList-v15x0    OPTIONAL,   -- Need OR
```

-continued

| SL-V2X-ConfigDedicated information element |
|---|

```
mcs-r15                              INTEGER (0..31)            OPTIONAL,  -- Need OR
},
ue-Selected-v15x0                    SEQUENCE {
  v2x-FreqSelectionConfigList-r15    SL-V2X-FreqSelectionConfigList-r15  OPTIONAL    -- Need OR
}
}
}                                                                OPTIONAL,   -- Need ON
v2x-PacketDuplicationConfig-r15      SL-V2X-PacketDuplicationConfig-r15   OPTIONAL,  -- Need OR
syncFreqList-r15                     SL-V2X-SyncFreqList-r15              OPTIONAL,  -- Need OR
slss-TxMultiFreq-r15                 ENUMERATED{true}                     OPTIONAL   -- Need OR
]]
}
LogicalChGroupInfoList-v15x0 ::=             SEQUENCE (SIZE (1..maxLCG-r13)) OF SL-ReliabilityList-r15
SL-TxPoolToAddModListV2X-r14 ::=             SEQUENCE (SIZE (1..maxSL-V2X-TxPool-r14)) OF SL-
TxPoolToAddMod-r14
SL-TxPoolToAddMod-r14 ::=            SEQUENCE {
poolIdentity-r14                        SL-V2X-TxPoolIdentity-r14,
pool-r14                                SL-CommResourcePoolV2X-r14
}
SL-TxPoolToReleaseListV2X-r14 ::=            SEQUENCE (SIZE (1.. maxSL-V2X-TxPool-r14)) OF SL-V2X-
TxPoolIdentity-r14
ASN1STOP
```

SL-V2X-PacketDuplicationConfig

The IE SL-V2X-PacketDuplicationConfig specifies the configuration information for sidelink packet duplication for V2X sidelink communication transmission.

| SL-V2X-PacketDuplicationConfig information element |
|---|

```
ASN1START
SL-V2X-PacketDuplicationConfig-r15           ::= SEQUENCE {
threshSL-Reliability-r15                     SL-Reliability-r15,
allowedCarrierFreqConfig-r15                 SL-PPPR-Dest-CarrierFreqList-r15    OPTIONAL,  -- Need OR
...
}
SL-PPPR-Dest-CarrierFreqList-r15 ::=         SEQUENCE (SIZE (1..maxSL-Dest-r12)) SL-PPPR-Dest-
CarrierFreq
SL-PPPR-Dest-CarrierFreq ::=         SEQUENCE {
destinationInfoList-r15                 SL-DestinationInfoList-r12           OPTIONAL,  -- Need OR
allowedCarrierFreqList-r15              SL-AllowedCarrierFreqList-r15        OPTIONAL   -- Need OR
}
SL-AllowedCarrierFreqList-r15 ::=    SEQUENCE {
allowedCarrierFreqSet1                  SEQUENCE (SIZE (1..maxFreqV2X-r14)) OF ARFCN-ValueEUTRA-r9,
allowedCarrierFreqSet2                  SEQUENCE (SIZE (1..maxFreqV2X-r14)) OF ARFCN-ValueEUTRA-r9
}
ASN1STOP
```

| SL-V2X-PacketDuplicationConfig field descriptions |
|---|
| allowedCarrierFreqList, allowedCarrierFreqSet1, allowedCarrierFreqSet2<br>Indicates, for V2X sidelink communiation, the set of carrier frequencies applicable for the transmission of the MAC SDUs from the sidelink logical channels whose associated destination are included in destinationInfoList (see TS 36.321 [6]). If present, E-UTRAN shall ensure allowedCarrierFreqSet1 and allowedCarrierFreqSet2 do not include the same carrier freqeuncy. |

| SL-V2X-PacketDuplicationConfig field descriptions |
|---|
| threshSL-Reliability<br>Indicates the reliability threshold used to determine whether sidelinik packet duplication is configured and activated for V2X sidelink communication transmission. See TS 36.323 [8] and TS 36.321 [6]. |

SL-Reliability

The IE SL-Reliability indicates one or more reliabilities of a logical channel group used in case of scheduled sidelink communication resources; see TS 36.321 [6].

| SL-Reliability information element |
|---|

```
ASN1START
SL-ReliabilityList-r15 ::= SEQUENCE (SIZE (1..maxSL-Reliability-r15)) OF SL-Reliability-r15
SL-Reliability-r15 ::=     INTEGER (1..8)
ASN1STOP
```

According to 3GPP TS36.300, carrier aggregation (CA) in sidelink is supported for V2X sidelink communication. It applies to both in coverage UEs and out of coverage UEs. In addition, sidelink packet duplication will be supported for V2X sidelink communication and may be performed at Packet Data Convergence Protocol (PDCP) layer of the UE. For sidelink packet duplication, a PDCP Protocol Data Unit (PDU) is duplicated at the PDCP entity for transmission. The duplicated PDCP PDUs of the same PDCP entity are submitted or delivered to two different Radio Link Control (RLC) entities and associated with two different sidelink logical channels respectively. The duplicated PDCP PDUs of the same PDCP entity are only allowed to be transmitted on different sidelink carriers. A UE can activate or deactivate sidelink packet duplication based on (pre)configuration. The Proximity Service (ProSe) Per-Packet Reliability (PPPR) value(s) for which sidelink packet duplication can be supported are determined according to a PPPR threshold. For example, sidelink packet duplication can be configured or enabled if the PPPR of a data packet is not lower than the PPPR threshold. For UE autonomous resource selection and scheduled resource allocation, the UE shall perform sidelink packet duplication for the data with the allowed PPPR value(s) until packet duplication is de-configured or disabled for these PPPR value(s). For scheduled resource allocation, the UE reports the amount of data associated with one or more PPPR values, and the destination(s) to which the data belongs via sidelink BSR(s). A mapping of PPPR values to logical channel groups can be configured by the eNB, and the PPPR value(s) are reflected by the associated logical channel group ID included in the sidelink BSR(s). A list of PPPR value(s) may be reported in Sidelink UE information by an RRC_CONNECTED UE. For a UE using scheduled resource allocation, two non-overlapped sets of carriers are configured by the eNB per Destination reported by the UE to the network, and they apply to some and/or all the PPPR(s) that are allowed for sidelink packet duplication. The UE then associates two duplicated sidelink logical channels corresponding to the same PDCP entity respectively with the two sets of carriers configured for the Destination of the two sidelink logical channels. The Destination could be an identity corresponding to one or more than one (receiving) UEs to which the (transmitting) UE performs sidelink communication transmission. The association between the duplicated sidelink logical channel and the carrier set is up to UE implementation. Data of a duplicated sidelink logical channel can only be transmitted on the carrier(s) in the associated carrier set.

Figure 9:
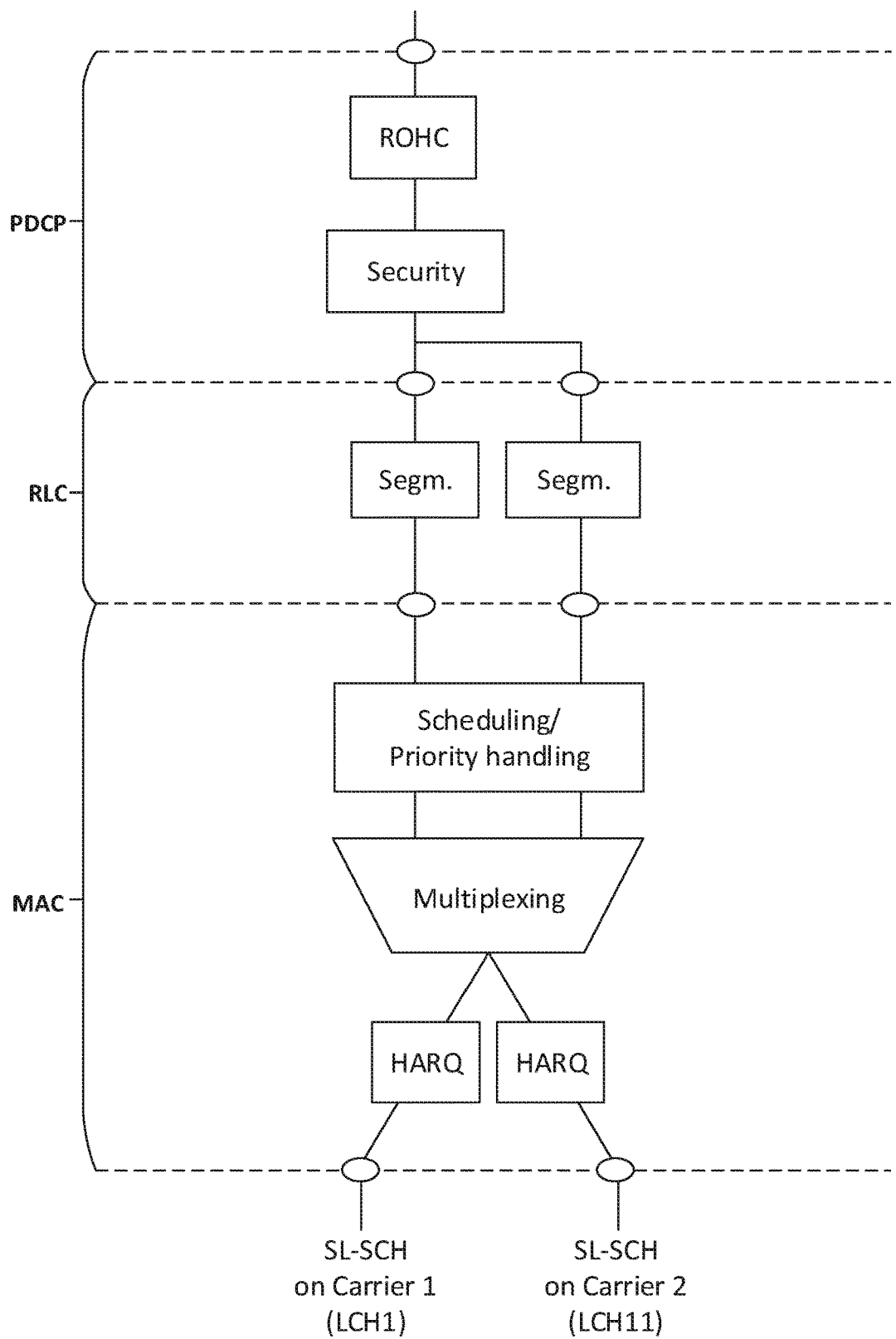
FIG. 9 illustrates an exemplary system for performing one or more transmission operations for sidelink packet duplication.

FIG. 9 illustrates an example of transmission operation for sidelink packet duplication. A transmitting UE may have data available for transmission (to a destination) on a sidelink radio bearer (SLRB). The SLRB could be associated with a reliability (e.g. PPPR). The transmitting UE may be configured with sidelink packet duplication on the SLRB. The reliability may be or may not be lower than a threshold. The transmitting UE may perform sidelink packet duplication on the SLRB if the reliability is not lower than the threshold. The transmitting UE could duplicate a PDCP PDU. The transmitting UE could deliver the PDCP PDU and the duplicate of the PDCP PDU to two different RLC entities associated with the SLRB. The transmitting UE could deliver the PDCP PDU to a first RLC entity associated with the SLRB. The transmitting UE could deliver the duplicate of the PDCP PDU to a second RLC entity associated with the SLRB. The transmitting UE could maintain state variable(s) used for sidelink transmission on the SLRB. The state variable used for sidelink transmission could be Next_PDCP_TX_SN. The state variable used for sidelink transmission could be TX_HFN. For the sidelink packet duplication, the transmitting UE may select a non-duplication logical channel from a first range (e.g. LCH1 to LCH10, '00001' to '01010') for sidelink transmission of the PDCP PDU. For the sidelink packet duplication, the transmitting UE may select a duplication logical channel from a second range (e.g. LCH11 to LCH20, '01011' to '10100') for sidelink transmission of the duplicate of the PDCP PDU. The values of LCID from the second range may identify the logical channels used to send duplicated RLC Service Data Units (SDUs) from logical channels of which the values of LCID from the first range respectively in sequential order. In this example, the transmitting UE may use a first logical channel (e.g. LCH1) and a second logical channel (e.g. LCH11) for the sidelink packet duplication. The transmitting UE may use a first carrier (e.g. Carrier 1) to serve the first logical channel. The transmitting UE may use a second carrier (e.g. Carrier 2) to serve the second logical channel.

Figure 10:
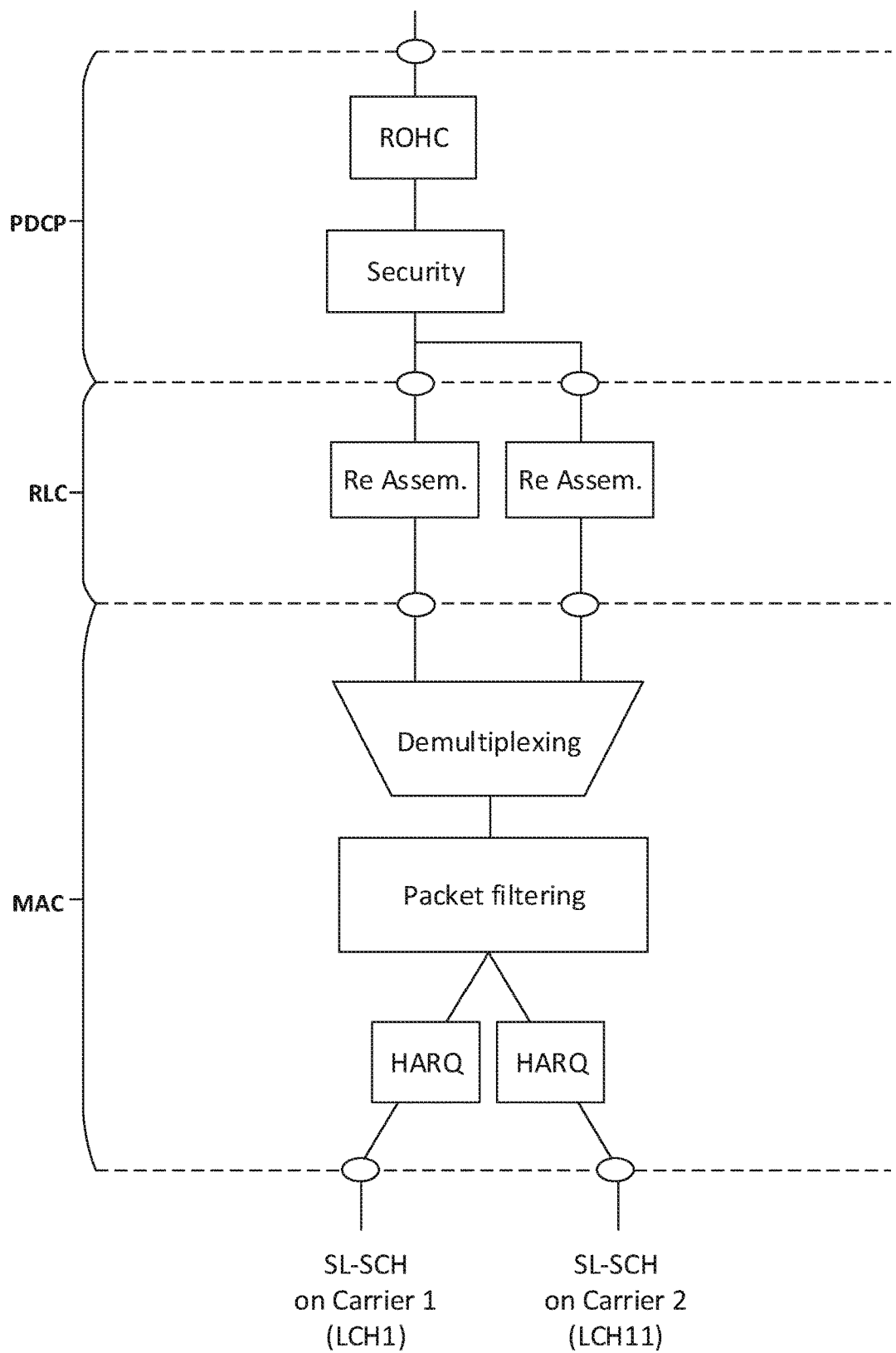
FIG. 10 illustrates an exemplary system for performing one or more reception operations for sidelink packet duplication.

FIG. 10 illustrates an example of reception operation for sidelink packet duplication. A receiving UE could detect sidelink packet duplication on a sidelink radio bearer (SLRB). When a PDCP PDU is received on a duplication logical channel (associated with the SLRB) or a PDCP Sequence Number (SN) of a PDCP PDU received on a non-duplication logical channel (associated with the SLRB) is not set to "0", the receiving UE could consider the SLRB applies the sidelink packet duplication. In this situation, the receiving UE could maintain some state variable used for sidelink reception (on the SLRB) based on received PDCP SN. The state variable used for sidelink reception could be a variable used to determine a COUNT. The state variable used for sidelink reception could be Next_PDCP_RX_SN. The state variable used for sidelink reception could be RX_HFN. Besides, the receiving UE could perform re-ordering procedure to make sure the PDCP SDUs received on the duplication logical channel and/or the non-duplication logical channel can be delivered to upper layer in sequence (based on PDCP SN of these PDCP SDUs).

The sidelink packet duplication could be configured via system information. A threshSL-Reliability (as specified in 3GPP TS36.331) used to determine if sidelink packet duplication is enabled or not could be provided in SL-V2X-PacketDuplicationConfig (as specified in 3GPP TS36.331) via system information. When the sidelink packet duplication is (to be) de-configured or disabled, the network may update the system information in which the SL-V2X-PacketDuplicationConfig could not be included or the threshSL-Reliability could be changed to a higher value. The threshSL-Reliability with a higher value could cause that the transmitting UE could consider the sidelink packet duplication for a SLRB is disabled (because the reliability of the SLRB is lower than the threshSL-Reliability). Alternatively, the sidelink packet duplication could be configured via a dedicated signalling for the UE. The threshSL-Reliability could be provided in the SL-V2X-PacketDuplicationConfig via the dedicated signalling. When the sidelink packet duplication is (to be) de-configured or disabled, the network may send to the UE another dedicated signalling in which the SL-V2X-PacketDuplicationConfig could not be included or the threshSL-Reliability could be reconfigured to a higher value. The dedicated signalling could be a RRC reconfiguration message. The transmitting UE could know if the sidelink packet duplication is de-configured (or disabled) or not based on whether the SL-V2X-PacketDuplicationConfig is removed or whether the threshSL-Reliability is changed/reconfigured. But, currently there is no mechanism for the receiving UE to detect that the sidelink packet duplication had been de-configured or disabled for a SLRB by the transmitting UE.

Figure 11:
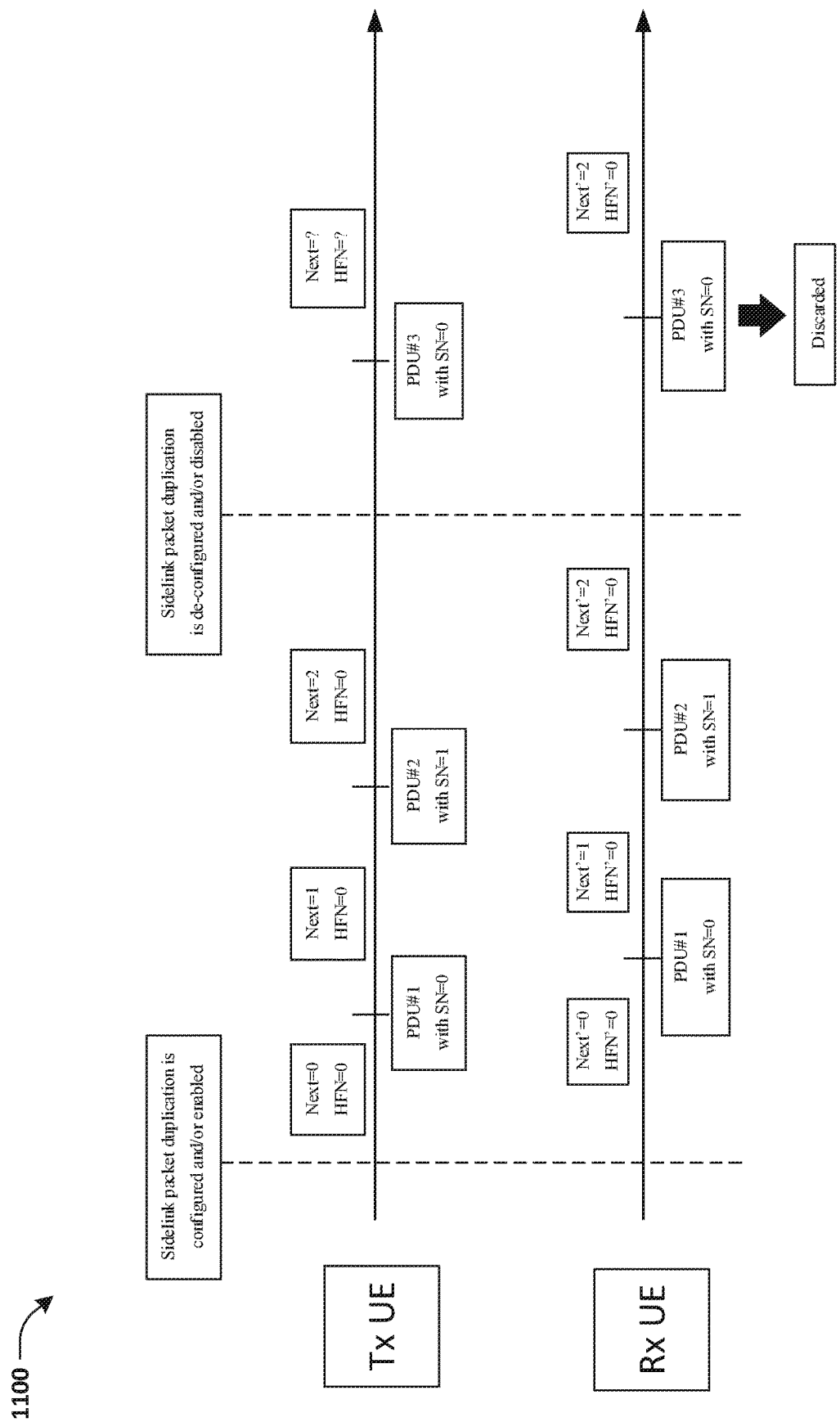
FIG. 11 illustrates an exemplary scenario associated with a transmitting User Equipment (UE) and/or a receiving UE.

According to 3GPP TS36.323, when the sidelink packet duplication is de-configured or disabled for an SLRB, the transmitting UE could not perform sidelink packet duplication for sidelink transmission on the SLRB. Furthermore, the transmitting UE could not maintain the state variable used for sidelink transmission on the SLRB. In this situation, the transmitting UE could set PDCP SN to "0" in the PDCP PDU header (after the sidelink packet duplication is de-configured or disabled). An exemplary scenario 1100 associated with the transmitting UE and/or the receiving UE is illustrated in FIG. 11. "Tx UE" could mean the transmitting UE and "Rx UE" could mean the receiving UE. "PDU #1 with SN=0" could mean a first PDCP PDU with PDCP SN=0. "PDU #2 with SN=1" could mean a second PDCP PDU with PDCP SN=1. "PDU #3 with SN=0" could mean a third PDCP PDU with PDCP SN=0. "Next=0" and "HFN=0" could mean that the transmitting UE could initiate the state variable(s) used for sidelink transmission with initial value when there is a sidelink transmission of a PDCP PDU. "Nexe=0" and "HFN'=0" could mean that the receiving UE could initiate the state variable(s) used for sidelink reception (with initial value) when a PDCP PDU with PDCP SN=0 is received on the duplication logical channel (or a PDCP PDU with PDCP SN not set to 0 is received on the non-duplication logical channel). "Next=?" and "HFN=?" could mean that the transmitting UE could not maintain the state variable(s) used for sidelink transmission. In FIG. 11, the transmitting UE could set the PDCP SN of the third PDCP PDU to "0" because the sidelink packet duplication has been de-configured or disabled. In this situation, the receiving UE could incorrectly discard the third PDCP PDU (and following PDCP PDUs after the third PDCP PDU) because the received PDCP SN (i.e. "0") is not larger than or equal to the current NEXT_PDCP_RX_SN (which is set to "2"). In other words, the third PDCP PDU could be discarded incorrectly because the receiving UE could consider the third PDCP PDU is out of a re-ordering window of the re-ordering procedure. Some solutions for the receiving UE to avoid incorrectly discarding PDCP PDUs received from the transmitting UE could be considered.

In one alternative, the transmitting UE could use a new logical channel for sidelink transmission if sidelink packet duplication is de-configured or disabled. The new logical channel could be associated with a new PDCP entity. The new logical channel could be associated with a new RLC entity. This new logical channel could have not been used for sidelink transmission yet. For example, the transmitting UE could use a first logical channel and a second logical channel for sidelink transmission on a SLRB when sidelink packet duplication is configured or enabled (on the SLRB). The first logical channel could be associated with the SLRB. The second logical channel could be associated with the SLRB. The first logical channel could be a first non-duplication logical channel. The second logical channel could be a duplication logical channel. The transmitting UE could use a third logical channel for sidelink transmission on the SLRB when the sidelink packet duplication is de-configured or disabled. The transmitting UE could use a third logical channel for sidelink transmission on the SLRB after the sidelink packet duplication is de-configured or disabled. The third logical channel could be a second non-duplication logical channel. The third logical channel could be associated with the SLRB.

In one embodiment, the transmitting UE could use a new logical channel for sidelink transmission on a SLRB when the sidelink packet duplication is de-configured or disabled on the SLRB.

In one embodiment, the transmitting UE could use a new logical channel for sidelink transmission on a SLRB after the sidelink packet duplication is de-configured or disabled on the SLRB.

In one embodiment, the transmitting UE could use a new logical channel for sidelink transmission on a SLRB in response to de-configuring or disabling the sidelink packet duplication on the SLRB.

In one embodiment, the transmitting UE could set a state variable used for sidelink transmission to an initial value when sidelink packet duplication is de-configured or disabled.

In one embodiment, the transmitting UE could set a state variable used for sidelink transmission to an initial value after sidelink packet duplication is de-configured or disabled.

In one embodiment, the transmitting UE could set a state variable used for sidelink transmission to an initial value in response to de-configuring or disabling sidelink packet duplication.

In one embodiment, the state variable used for sidelink transmission could be Next_PDCP_TX_SN or TX_HFN.

In one embodiment, the initial value could be "0".

In another alternative, a sidelink control information (SCI) associated with a sidelink transmission could indicate if sidelink packet duplication is configured or de-configured (or if sidelink packet duplication is enabled or disabled).

In one embodiment, the SCI could be associated with the sidelink transmission on a SLRB. The sidelink packet duplication could be configured or enabled on the SLRB.

In one embodiment, the SCI could include a field used to indicate if the sidelink packet duplication is configured or enabled (or if the sidelink packet duplication is de-configured or disabled).

In one embodiment, the transmitting UE could set a field used to indicate sidelink packet duplication is configured or enabled in the SCI when the sidelink packet duplication is configured or enabled.

In one embodiment, the transmitting UE could set a field used to indicate sidelink packet duplication is de-configured or disabled in the SCI when the sidelink packet duplication is de-configured or disabled.

In one embodiment, the receiving UE could perform a re-ordering procedure for sidelink reception if a field in a SCI for the sidelink reception indicates sidelink packet duplication is configured or enabled.

In one embodiment, the receiving UE could not perform a re-ordering procedure for sidelink reception if a field in a SCI for the sidelink reception indicates sidelink packet duplication is de-configured or disabled.

In one embodiment, the receiving UE could maintain a state variable used for sidelink reception if a field in a SCI for the sidelink reception indicates sidelink packet duplication is configured or enabled.

In one embodiment, the receiving UE could not maintain a state variable used for sidelink reception if a field in a SCI for the sidelink reception indicates sidelink packet duplication is de-configured or disabled.

In one embodiment, the state variable used for sidelink reception could be Next_PDCP_RX_SN or RX_HFN.

In another alternative, a header of a sidelink transmission could indicate if sidelink packet duplication is configured or de-configured (or if sidelink packet duplication is enabled or disabled).

In one embodiment, the header of the sidelink transmission could be a PDCP header, a RLC header or a MAC header.

In one embodiment, the header could include a field used to indicate if the sidelink packet duplication is configured or enabled (or if the sidelink packet duplication is de-configured or disabled).

In one embodiment, the transmitting UE could set a field used to indicate sidelink packet duplication is configured or enabled in the header when the sidelink packet duplication is configured or enabled.

In one embodiment, the transmitting UE could set a field used to indicate sidelink packet duplication is de-configured or disabled in the header when the sidelink packet duplication is de-configured or disabled.

In one embodiment, the receiving UE could perform a re-ordering procedure for sidelink reception if a field in a header of the sidelink reception indicates sidelink packet duplication is configured or enabled.

In one embodiment, the receiving UE could not perform a re-ordering procedure for sidelink reception if a field in a header of the sidelink reception indicates sidelink packet duplication is de-configured or disabled.

In one embodiment, the receiving UE could maintain a state variable used for sidelink reception if a field in a header of the sidelink reception indicates sidelink packet duplication is configured or enabled.

In one embodiment, the receiving UE could not maintain a state variable used for sidelink reception if a field in a header of the sidelink reception indicates sidelink packet duplication is de-configured or disabled.

In one embodiment, the state variable used for sidelink reception could be Next_PDCP_RX_SN or RX_HFN.

In another alternative, a specific range of PDCP SN could be used for sidelink transmission if sidelink packet duplication is de-configured or disabled. For example, PDCP SN from X to Y could be used when the sidelink packet duplication is de-configured or disabled, and PDCP SN from Y+1 to maximum value of PDCP SN could be used when the sidelink packet duplication is configured or enabled. The X could be "0". The Y could be "0". In this example, the PDCP SN=0 is used for sidelink transmission when the sidelink packet duplication is de-configured or disabled. In this example, the PDCP SN not set to 0 is used for sidelink transmission when the sidelink packet duplication is configured or enabled. In this example, the transmitting UE could set PDCP SN=1 for a PDCP PDU next to a PDCP PDU with PDCP SN currently set to maximum value which had been transmitted or delivered to lower layer for transmission. The maximum value could be 65535.

In another alternative, a distance between a received PDCP SN and a processed PDCP SN could be used to determine if sidelink packet duplication is de-configured or disabled. In this principle, if the received PDCP SN is 0 but it is far from the processed PDCP SN, the receiving UE could consider the sidelink packet duplication is de-configured or disabled.

In one embodiment, the processed PDCP SN could be a PDCP SN of a PDCP SDU last submitted to upper layer. The PDCP SN of the PDCP SDU last submitted to upper layer could be Last_Submitted_RX_SN.

In one embodiment, the distance could be based on a size of receiving/re-ordering window. The receiving/re-ordering window could be Reordering_Window. The distance could be the size of the receiving/re-ordering window. The distance could be half size of the receiving/re-ordering window. The distance could be a specific percent size of the receiving/re-ordering window. For example with this principle, when Last_Submitted_RX_SN−received SN (i.e. "0")>Receiving_Window, the receiving UE could consider the sidelink packet duplication is de-configured or disabled.

In one embodiment, the distance could be pre-configured on the receiving UE.

In one embodiment, the distance could be configured by the network (e.g. gNB).

In one embodiment, the specific percent size of the receiving/re-ordering window could be pre-configured on the UE.

In one embodiment, the specific percent size of the receiving/re-ordering window could be configured by the network (e.g. gNB).

If the transmitting UE is in RRC_CONNECTED, the transmitting UE could be configured to associate a logical channel group (LCG) with a duplication logical channel of a SLRB on which sidelink packet duplication is configured or enabled. The transmitting UE could transmit a SL BSR including buffer status of the LCG to the network (e.g. gNB). And then the network could allocate the transmitting UE with resources for sidelink transmission based on the sidelink BSR. Since the transmitting UE could not perform the sidelink packet duplication when the sidelink packet duplication is de-configured/disabled for the SLRB, it is beneficial for the UE to release the RLC entity associated with the duplication logical channel of the SLRB. Otherwise, the transmission buffer of the RLC entity may be taken into account for SL BSR reporting, which may cause the network to schedule more resources than needed for the associated LCG.

In one embodiment, the transmitting UE could release or remove a RLC entity associated with a SLRB if sidelink packet duplication is de-configured or disabled on the SLRB. The RLC entity corresponds to a duplication logical channel associated with the SLRB.

In one embodiment, the transmitting UE could flush or clear a transmission buffer of a RLC entity associated with a SLRB if sidelink packet duplication is de-configured or disabled on the SLRB. The RLC entity could be used for transmission of a duplicate of a PDCP PDU.

In one embodiment, the transmitting UE could flush or clear a transmission buffer of a duplication logical channel associated with a SLRB if sidelink packet duplication is de-configured or disabled on the SLRB.

In one embodiment, the transmitting UE could release or remove a duplication logical channel associated with a SLRB if sidelink packet duplication is de-configured or disabled on the SLRB.

In one embodiment, the RLC entity associated with the SLRB could be an acknowledged mode (AM) RLC entity.

In one embodiment, the RLC entity associated with the SLRB could be an unacknowledged mode (UM) RLC entity.

In another alternative, the receiving UE could detect sidelink packet duplication is de-configured or disabled (on the transmitting UE) based on successive receptions of PDCP SDUs/PDUs with PDCP SN set to "0" on a non-duplication logical channel of a SLRB. The sidelink packet duplication could be de-configured or disabled on a SLRB. The receiving UE could store or buffer a first PDCP SDU/PDU received on a non-duplication logical channel of the SLRB if a PDCP SN of the first PDCP SDU/PDU is out of a re-ordering window of the re-ordering procedure applied for sidelink reception and equal to '0'. The receiving UE could consider the sidelink packet duplication is de-configured or disabled for the SLRB if a PDCP SN of a second PDCP SDU/PDU received on the non-duplication logical channel of the SLRB, following reception of the first PDCP SDU/PDU, is also equal to '0'. In this situation, the receiving UE could then deliver the first PDCP SDU/PDU to upper layer. In case the PDCP SN of the first PDCP SDU/PDU is within the re-ordering window of the re-ordering procedure, the receiving UE could also consider the sidelink packet duplication is de-configured or disabled for the SLRB if PDCP SNs of both the first PDCP SDU/PDU and the second PDCP SDU/PDU are equal to '0'. It is also feasible to apply the concept of more than 2 successive receptions of PDCP SDUs/PDUs with PDCP SN set to "0" on a non-duplication logical channel of a SLRB for the receiving UE to detect sidelink packet duplication is de-configured or disabled.

The receiving UE could discard the first PDCP SDU/PDU if the PDCP SN of the second PDCP SDU/PDU received on the non-duplication logical channel of the SLRB following the first PDCP SDU/PDU is not equal to '0'. In this situation, the receiving UE could consider the sidelink packet duplication is still configured or enabled for the SLRB. It is also possible the second PDCP SDU/PDU, following reception of the first PDCP SDU/PDU, could be received on the duplication logical channel of the SLRB. If this is the case, the receiving UE could also consider the sidelink packet duplication is still configured or enabled for the SLRB and discard the first PDCP SDU/PDU.

If the receiving UE could consider/detect/determine that sidelink packet duplication is de-configured or disabled (for a SLRB), the receiving UE could not (continue to) perform the re-ordering procedure. In this situation, a re-ordering timer (e.g. t-Reordering) of the re-ordering procedure may no more be considered as valid or applicable after the re-ordering procedure has been disabled. Thus, it seems reasonable for the receiving UE to deliver those PDCP SDUs belonging to the SLRB stored or buffered in the PDCP layer to upper layer (i.e. those PDCP SDUs have not yet been delivered to upper layer) immediately instead of relying on expiry of the re-ordering timer. It is beneficial because delivery latency is in general quite important for V2X messages.

In one embodiment, the receiving UE could deliver a PDCP SDU associated with a SLRB to upper layer if sidelink packet duplication is de-configured or disabled on the SLRB. The PDCP SDU could be stored or buffered in the PDCP layer of the receiving UE due to the re-ordering procedure. Basically, PDCP SDUs may be delivered to upper layer if in-sequence PDCP SDUs are received. Otherwise, the received PDCP SDUs may be stored in the PDCP layer. The PDCP SDU could be within a re-ordering window of the re-ordering procedure.

In one embodiment, the receiving UE could stop or disable a re-ordering timer of the re-ordering procedure for sidelink reception on a SLRB when sidelink packet duplication is de-configured or disabled on the SLRB. The re-ordering timer could be associated with a re-ordering window of the re-ordering procedure.

In one embodiment, the receiving UE could stop or disable a re-ordering timer of the re-ordering procedure for a SLRB when the receiving UE successively receives PDCP SDUs with PDCP SN set to "0" associated with the SLRB. The re-ordering timer could be associated with a re-ordering window of the re-ordering procedure. These PDCP SDUs could be within a re-ordering window of the re-ordering procedure. These PDCP SDU could be out of a re-ordering window of the re-ordering procedure.

In one embodiment, the receiving UE could stop or disable a re-ordering timer of the re-ordering procedure for a SLRB when the receiving UE receives a second PDCP SDU with PDCP SN set to "0" associated with the SLRB and the receiving UE has received a first PDCP SDU with PDCP SN set to "0" associated with the SLRB followed by the second PDCP SDU. The re-ordering timer could be associated with a re-ordering window of the re-ordering procedure. The first PDCP SDU could be within a re-ordering window of the re-ordering procedure. The first PDCP SDU could be out of a re-ordering window of the re-ordering procedure. The second PDCP SDU could be within a re-ordering window of the re-ordering procedure. The second PDCP SDU could be out of a re-ordering window of the re-ordering procedure.

In the current PDCP specification, the receiving UE does not perform the re-ordering procedure for data packets received on a SLRB before sidelink packet duplication is configured or enabled for the SLRB and the receiving UE starts to perform the re-ordering procedure when the sidelink packet duplication is configured or enabled. If the receiving UE does not apply a mechanism to detect sidelink packet duplication de-configuration or disabling, the receiving UE could continue performing the re-ordering procedure for a SLRB even if sidelink packet duplication is de-configured or disabled for the SLRB. To allow the receiving UE to continue the re-ordering procedure without affecting sidelink reception after sidelink packet duplication has been de-configured or disabled, another alternative is that the transmitting UE could continue setting normal PDCP SN values for following sidelink transmission of PDCP PDUs after the sidelink packet duplication is de-configured or disabled.

In one embodiment, the transmitting UE does not maintain the state variable(s) used for sidelink transmission for a SLRB before the sidelink packet duplication is configured or enabled for the SLRB. It is also feasible for the transmitting UE to maintain the state variable(s) used for sidelink transmission for a SLRB before the sidelink packet duplication is configured or enabled for the SLRB.

In one embodiment, the transmitting UE starts to maintain the state variable(s) used for sidelink transmission on a SLRB when the sidelink packet duplication is configured or enabled for the SLRB.

In one embodiment, the transmitting UE continues maintaining the state variable(s) used for sidelink transmission on a SLRB after the sidelink packet duplication is de-configured or disabled for the SLRB.

In one embodiment, the state variable used for sidelink transmission could be Next_PDCP_TX_SN or TX_HFN.

In one embodiment, the transmitting UE does not duplicate a PDCP PDU of a SLRB before sidelink packet duplication is configured or enabled for the SLRB.

In one embodiment, the transmitting UE duplicates a PDCP PDU of a SLRB after sidelink packet duplication is configured or enabled for the SLRB.

In one embodiment, the transmitting UE does not duplicate a PDCP PDU of a SLRB after sidelink packet duplication is de-configured or disabled for the SLRB.

In one embodiment, the transmitting UE delivers a duplicate of a PDCP PDU of a SLRB to lower layer after sidelink packet duplication is configured or enabled for the SLRB.

In one embodiment, the transmitting UE releases or removes a RLC entity associated with a SLRB if sidelink packet duplication is de-configured or disabled for the SLRB. The RLC entity corresponds to a duplication logical channel associated with the SLRB.

In one embodiment, the transmitting UE discards a duplicate of a PDCP PDU of a SLRB when or after sidelink packet duplication is de-configured or disabled for the SLRB. The duplicate of the PDCP PDU has been delivered to a lower layer (e.g. RLC entity and/or MAC entity). The duplicate of the PDCP PDU has been generated before the sidelink packet duplication is de-configured or disabled. The duplicate of the PDCP PDU has been buffered or stored in the transmitting UE before the sidelink packet duplication is de-configured or disabled.

In one embodiment, the transmitting UE continues transmitting a PDCP PDU of a SLRB with PDCP SN not set to "0" after sidelink packet duplication is de-configured or disabled for the SLRB. For example, the transmitting UE transmits a first PDCP PDU with PDCP SN set to X before the sidelink packet duplication is de-configured or disabled. The transmitting UE transmits a second PDCP PDU with PDCP SN set to X+Y after the sidleink packet duplication is de-configured or disabled. The first PDCP PDU is followed by the second PDCP PDU. The X is an integer. The Y is an integer. The Y could be '1'. The X could be increased to X+Y after the X is set to the PDCP SN of the first PDCP PDU.

Figure 12:
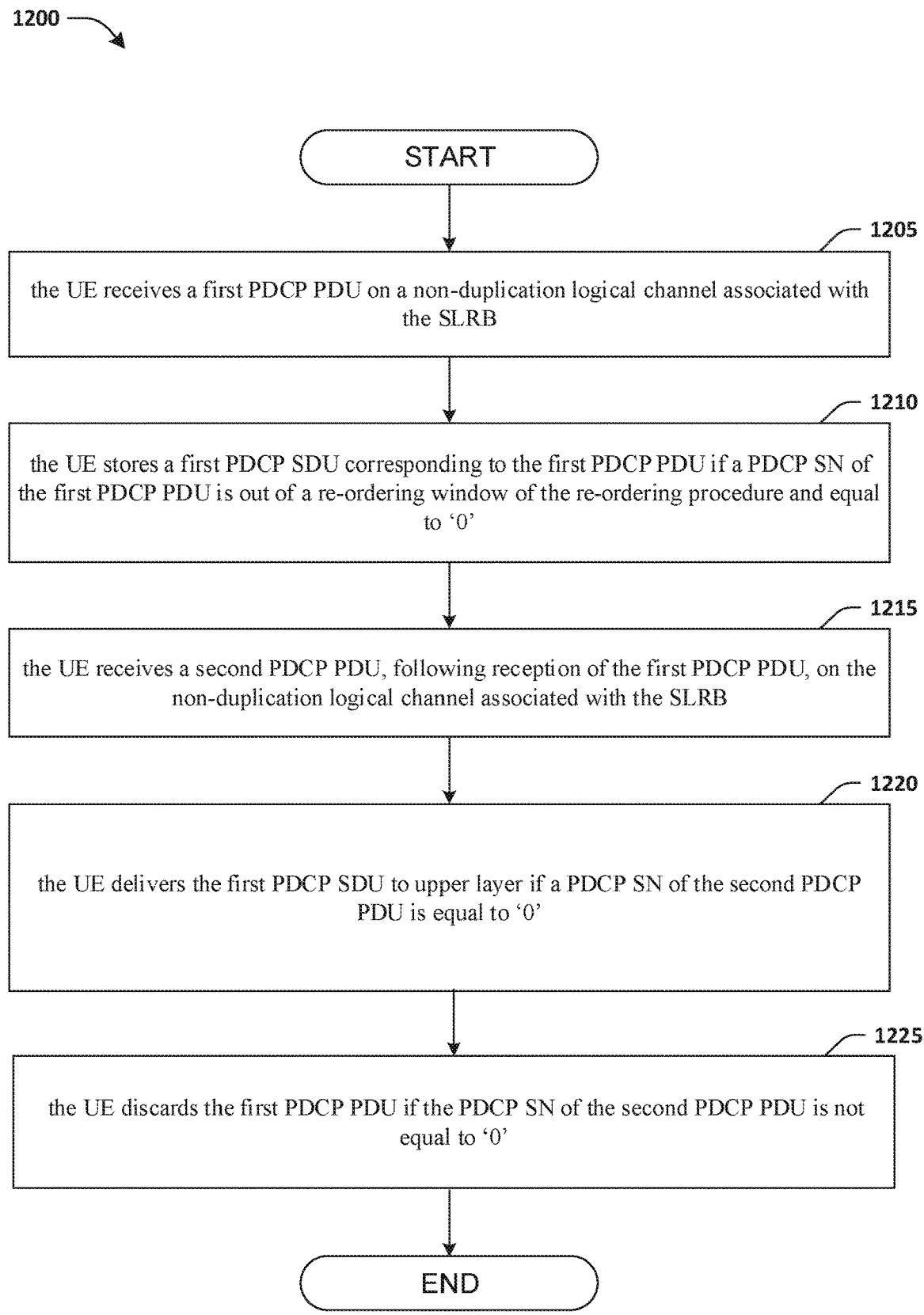
FIG. 12 is a flow chart according to one exemplary embodiment.

FIG. 12 is a flow chart 1200 according to one exemplary embodiment from the perspective of a UE for detecting sidelink packet duplication de-configuration or disabling, wherein the sidelink packet duplication is configured or enabled for a SLRB in the UE and a re-ordering procedure is performed for sidelink reception on the SLRB. In step 1205, the UE receives a first PDCP PDU on a non-duplication logical channel associated with the SLRB. In step 1210, the UE stores a first PDCP SDU corresponding to the first PDCP PDU if a PDCP SN of the first PDCP PDU is out of a re-ordering window of the re-ordering procedure and equal to '0'. In step 1215, the UE receives a second PDCP PDU, following reception of the first PDCP PDU, on the non-duplication logical channel associated with the SLRB. In step 1220, the UE delivers the first PDCP SDU to upper layer if a PDCP SN of the second PDCP PDU is equal to '0'. In step 1225, the UE discards the first PDCP PDU if the PDCP SN of the second PDCP PDU is not equal to '0'.

In one embodiment, the UE could consider the sidelink packet duplication is de-configured or disabled for the SLRB if the PDCP SN of the second PDCP PDU is equal to '0'.

In one embodiment, the UE could discard the first PDCP PDU if a third PDCP PDU is received, following reception of the first PDCP PDU, on a duplication logical channel associated with the SLRB.

In one embodiment, the UE could deliver the second PDCP SDU corresponding to the second PDCP PDU to upper layer if the PDCP SN of the second PDCP PDU is equal to '0'.

Referring back to FIGS. 3 and 4, in one exemplary embodiment of a UE, the device 300 includes a program code 312 stored in the memory 310. The CPU 308 could execute program code 312 to enable the UE (i) to receive a first PDCP PDU on a non-duplication logical channel associated with the SLRB, (ii) to store a first PDCP SDU corresponding to the first PDCP PDU if a PDCP SN of the first PDCP PDU is out of a re-ordering window of the re-ordering procedure and equal to '0', (iii) to receive a second PDCP PDU, following reception of the first PDCP PDU, on the non-duplication logical channel associated with the SLRB, (iv) to deliver the first PDCP SDU to upper layer if a PDCP SN of the second PDCP PDU is equal to '0', and (v) to discard the first PDCP PDU if the PDCP SN of the second PDCP PDU is not equal to '0'. Furthermore, the CPU 308 can execute the program code 312 to perform all of the above-described actions and steps or others described herein.

Figure 13:
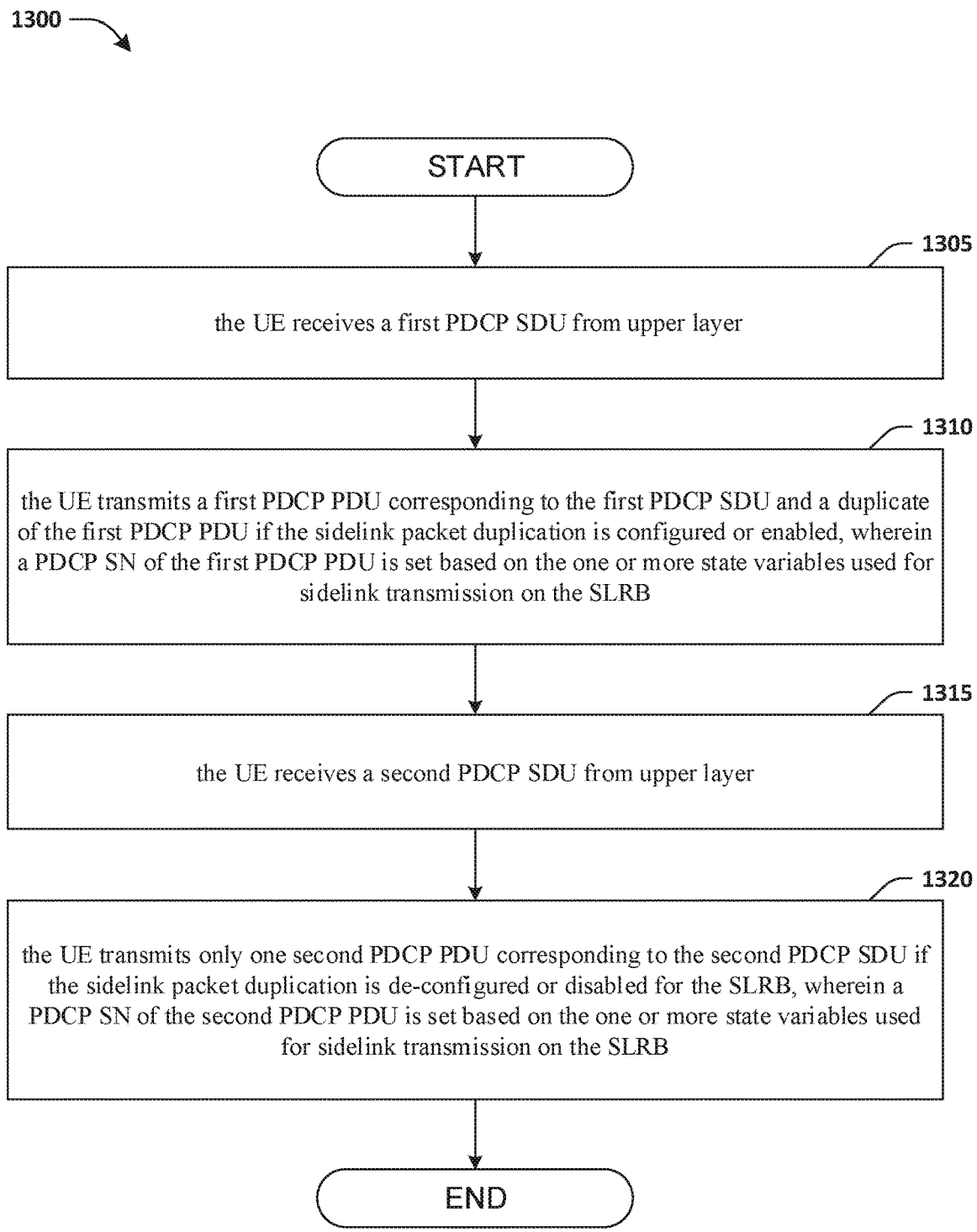
FIG. 13 is a flow chart according to one exemplary embodiment.

FIG. 13 is a flow chart 1300 according to one exemplary embodiment from the perspective of a UE, wherein sidelink packet duplication is configured or enabled for a SLRB in the UE and one or more state variables used for sidelink transmission on the SLRB is maintained by the UE. In step 1305, the UE receives a first PDCP SDU from upper layer. In step 1310, the UE transmits a first PDCP PDU corresponding to the first PDCP SDU and a duplicate of the first PDCP PDU if the sidelink packet duplication is configured or enabled, wherein a PDCP SN of the first PDCP PDU is set based on the one or more state variables used for sidelink transmission on the SLRB. In step 1315, the UE receives a second PDCP SDU from upper layer. In step 1320, the UE transmits only one second PDCP PDU corresponding to the second PDCP SDU if the sidelink packet duplication is de-configured or disabled for the SLRB, wherein a PDCP SN of the second PDCP PDU is set based on the one or more state variables used for sidelink transmission on the SLRB.

In one embodiment, the UE transmits only one second PDCP PDU corresponding to the second PDCP SDU after the sidelink packet duplication is de-configured or disabled for the SLRB, wherein a PDCP SN of the second PDCP PDU is set based on the one or more state variables used for sidelink transmission on the SLRB.

In one embodiment, the UE maintains the one or more state variables used for sidelink transmission on the SLRB if the sidelink packet duplication is configured or enabled.

In one embodiment, the UE continue maintaining the one or more state variables used for sidelink transmission on the SLRB after the sidelink packet duplication is de-configured or disabled.

In one embodiment, the UE could receive a signalling from a network node, wherein the signalling indicates the sidelink packet duplication is de-configured or disabled.

In one embodiment, the first and the second PDCP PDUs are transmitted on a non-duplication logical channel.

In one embodiment, the duplicate of the first PDCP PDU is transmitted on a duplication logical channel.

In one embodiment, the non-duplication logical channel is associated with the SLRB.

In one embodiment, the duplication logical channel is associated with the SLRB.

In one embodiment, the one or more state variables used for sidelink transmission on the SLRB is Next_PDCP_TX_SN.

In one embodiment, the one or more state variables used for sidelink transmission on the SLRB is TX_HFN.

In one embodiment, the signalling is a system information block.

In one embodiment, the signalling is a RRC reconfiguration message.

In one embodiment, the sidelink packet duplication is de-configured or disabled if threshSL-Reliability or SL-V2X-PacketDuplicationConfig is not provided in the system information or the RRC reconfiguration message.

In one embodiment, the sidelink packet duplication is de-configured or disabled if threshSL-Reliability or SL-V2X-PacketDuplicationConfig is removed from the system information or the RRC reconfiguration message.

Referring back to FIGS. 3 and 4, in one exemplary embodiment of a UE, the device 300 includes a program code 312 stored in the memory 310. The CPU 308 could execute program code 312 to enable the UE (i) to receive a first PDCP SDU from upper layer, (ii) to transmit a first PDCP PDU corresponding to the first PDCP SDU and a duplicate of the first PDCP PDU if the sidelink packet duplication is configured or enabled, wherein a PDCP SN of the first PDCP PDU is set based on the one or more state variables used for sidelink transmission on the SLRB, (iii) to receive a second PDCP SDU from upper layer, and (iv) to transmit only one second PDCP PDU corresponding to the second PDCP SDU if the sidelink packet duplication is de-configured or disabled for the SLRB, wherein a PDCP SN of the second PDCP PDU is set based on the one or more state variables used for sidelink transmission on the SLRB. Furthermore, the CPU 308 can execute the program code 312 to perform all of the above-described actions and steps or others described herein.

Figure 14:
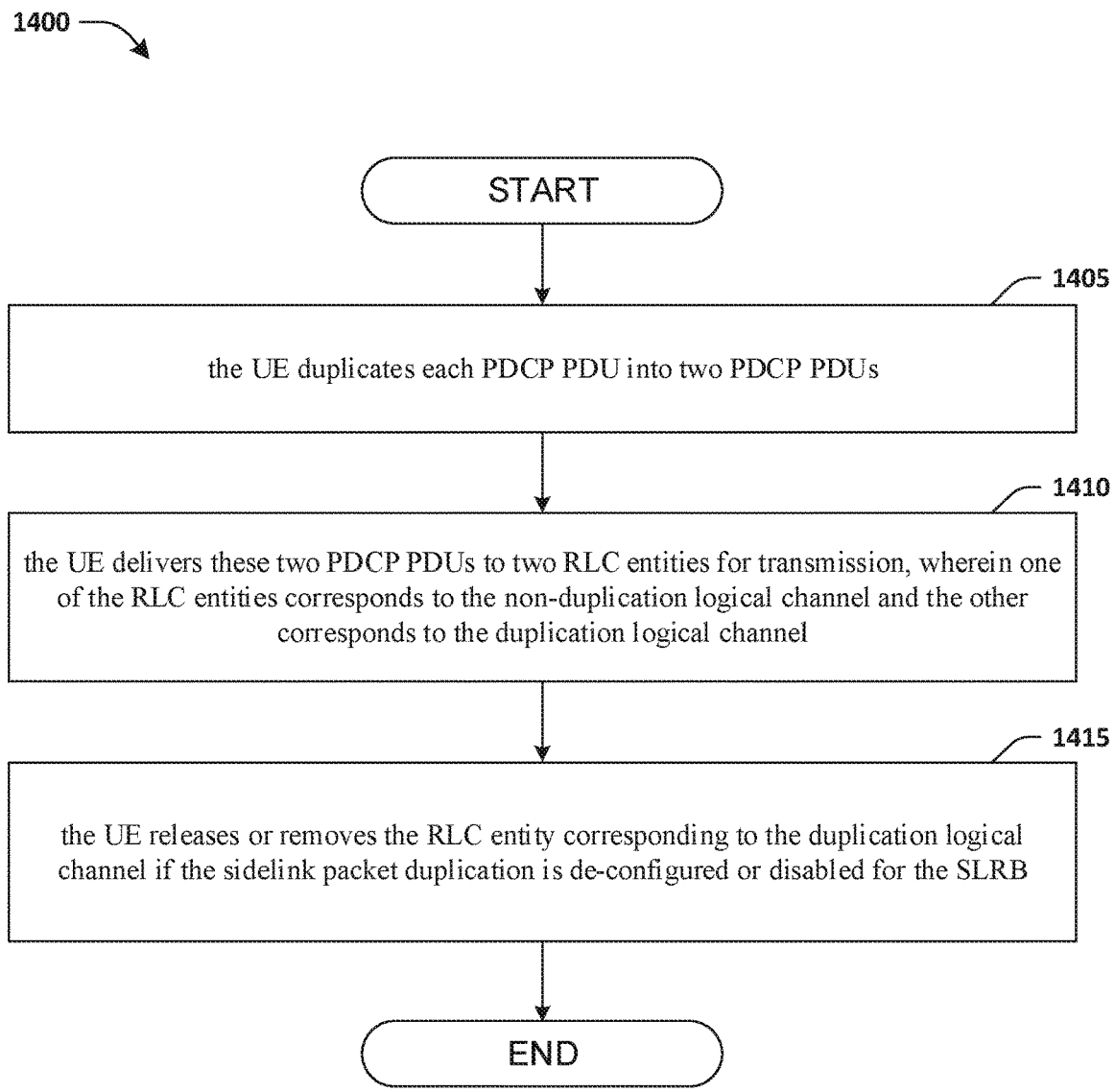
FIG. 14 is a flow chart according to one exemplary embodiment.

FIG. 14 is a flow chart 1400 according to one exemplary embodiment from the perspective of a UE for response to sidelink packet duplication de-configuration or disabling, wherein the sidelink packet duplication is configured or enabled for a SLRB in the UE and the SLRB is associated with a non-duplication logical channel and a duplication logical channel. In step 1405, the UE duplicates each PDCP PDU into two PDCP PDUs. In step 1410, the UE delivers these two PDCP PDUs to two RLC entities for transmission, wherein one of the RLC entities corresponds to the non-duplication logical channel and the other corresponds to the duplication logical channel. In step 1415, the UE releases or removes the RLC entity corresponding to the duplication logical channel if the sidelink packet duplication is de-configured or disabled for the SLRB.

In one embodiment, the UE could release or remove the duplication logical channel if the sidelink packet duplication is de-configured or disabled for the SLRB.

In one embodiment, the UE could receive a signalling from a network node, wherein the signalling indicates the sidelink packet duplication is de-configured or disabled for the SLRB.

In one embodiment, the signalling is a system information block.

In one embodiment, the signalling is a RRC reconfiguration message.

Referring back to FIGS. 3 and 4, in one exemplary embodiment of a UE, the device 300 includes a program code 312 stored in the memory 310. The CPU 308 could execute program code 312 to enable the UE (i) to duplicate each PDCP PDU into two PDCP PDUs, (ii) to deliver these two PDCP PDUs to two RLC entities for transmission, wherein one of the RLC entities corresponds to the non-duplication logical channel and the other corresponds to the duplication logical channel, and (iii) to release or remove the RLC entity corresponding to the duplication logical channel if the sidelink packet duplication is de-configured or disabled for the SLRB. Furthermore, the CPU 308 can execute the program code 312 to perform all of the above-described actions and steps or others described herein.

Figure 15:
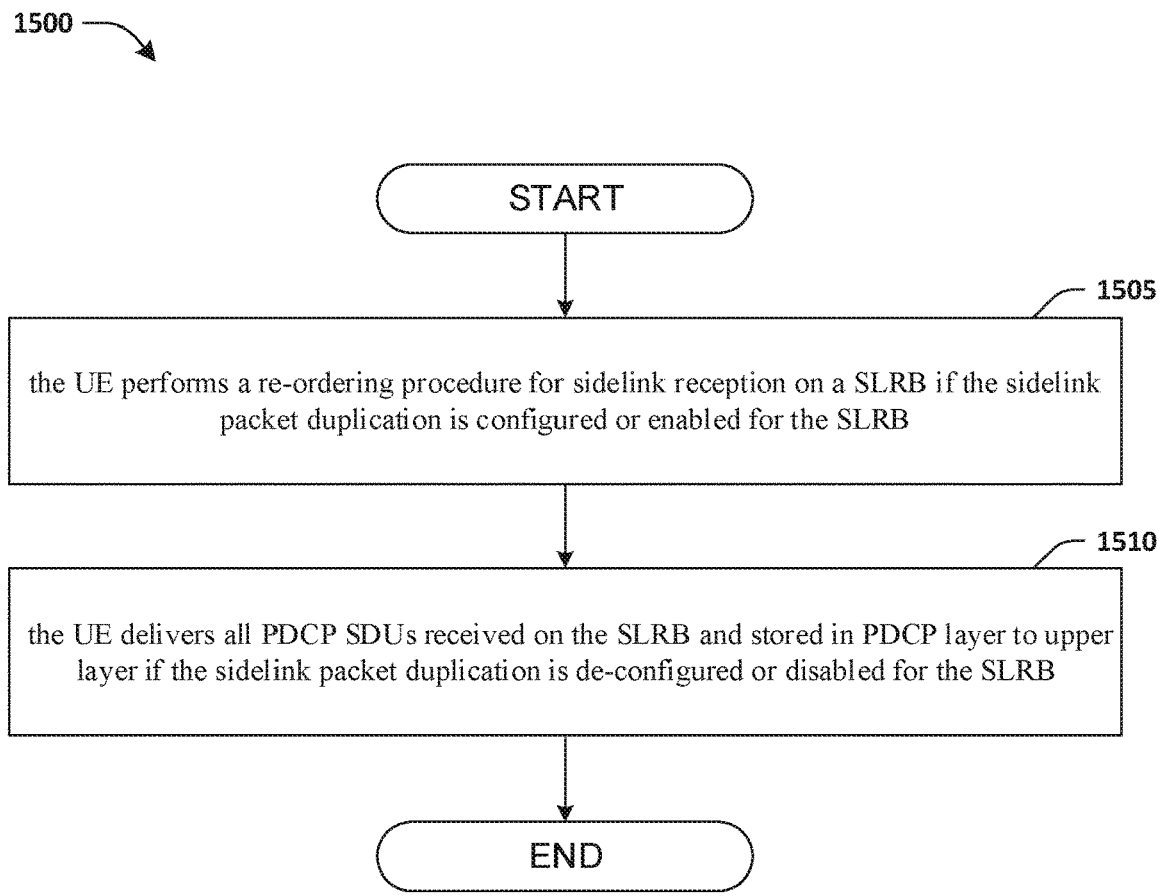
FIG. 15 is a flow chart according to one exemplary embodiment.

FIG. 15 is a flow chart 1500 according to one exemplary embodiment from the perspective of a UE for response to sidelink packet duplication de-configuration or disabling. In step 1505, the UE performs a re-ordering procedure for sidelink reception on a SLRB if the sidelink packet duplication is configured or enabled for the SLRB. In step 1510, the UE delivers some and/or all PDCP SDUs received on the SLRB and stored in PDCP layer to upper layer if the sidelink packet duplication is de-configured or disabled for the SLRB.

In one embodiment, the UE could detect the sidelink packet duplication is configured or enabled for the SLRB based on a reception of a PDCP PDU with PDCP SN set to "0" on a duplication logical channel or a reception of a PDCP PDU with PDCP SN not set to "0" on a non-duplication logical channel.

In one embodiment, the UE could detect the sidelink packet duplication is de-configured or disabled for the SLRB based on successive receptions of PDCP PDUs with PDCP SN set to "0".

In one embodiment, the UE could detect the sidelink packet duplication is de-configured or disabled for the SLRB based on an indication included in a sidelink control information of a sidelink reception on the SLRB.

In one embodiment, the UE could detect the sidelink packet duplication is de-configured or disabled for the SLRB based on an indication included in a header of a sidelink reception on the SLRB.

In one embodiment, the header of the sidelink reception on the SLRB is a PDCP header.

In one embodiment, the PDCP PDUs with PDCP SN set to "0" are successively received on a non-duplication logical channel.

In one embodiment, the non-duplication logical channel is associated with the SLRB.

In one embodiment, the UE could stop a re-ordering timer of the re-ordering procedure when the sidelink packet duplication is de-configured or disabled for the SLRB.

In one embodiment, the UE could not perform the re-ordering procedure for sidelink reception on a SLRB if the sidelink packet duplication is de-configured or disabled for the SLRB.

In one embodiment, the network node is a base station or a gNB.

Referring back to FIGS. 3 and 4, in one exemplary embodiment of a UE, the device 300 includes a program code 312 stored in the memory 310. The CPU 308 could execute program code 312 to enable the UE (i) to perform a re-ordering procedure for sidelink reception on a SLRB if the sidelink packet duplication is configured or enabled for the SLRB, and (ii) to deliver all PDCP SDUs received on the SLRB and stored in PDCP layer to upper layer if the sidelink packet duplication is de-configured or disabled for the SLRB. Furthermore, the CPU 308 can execute the program code 312 to perform all of the above-described actions and steps or others described herein.

Figure 16:
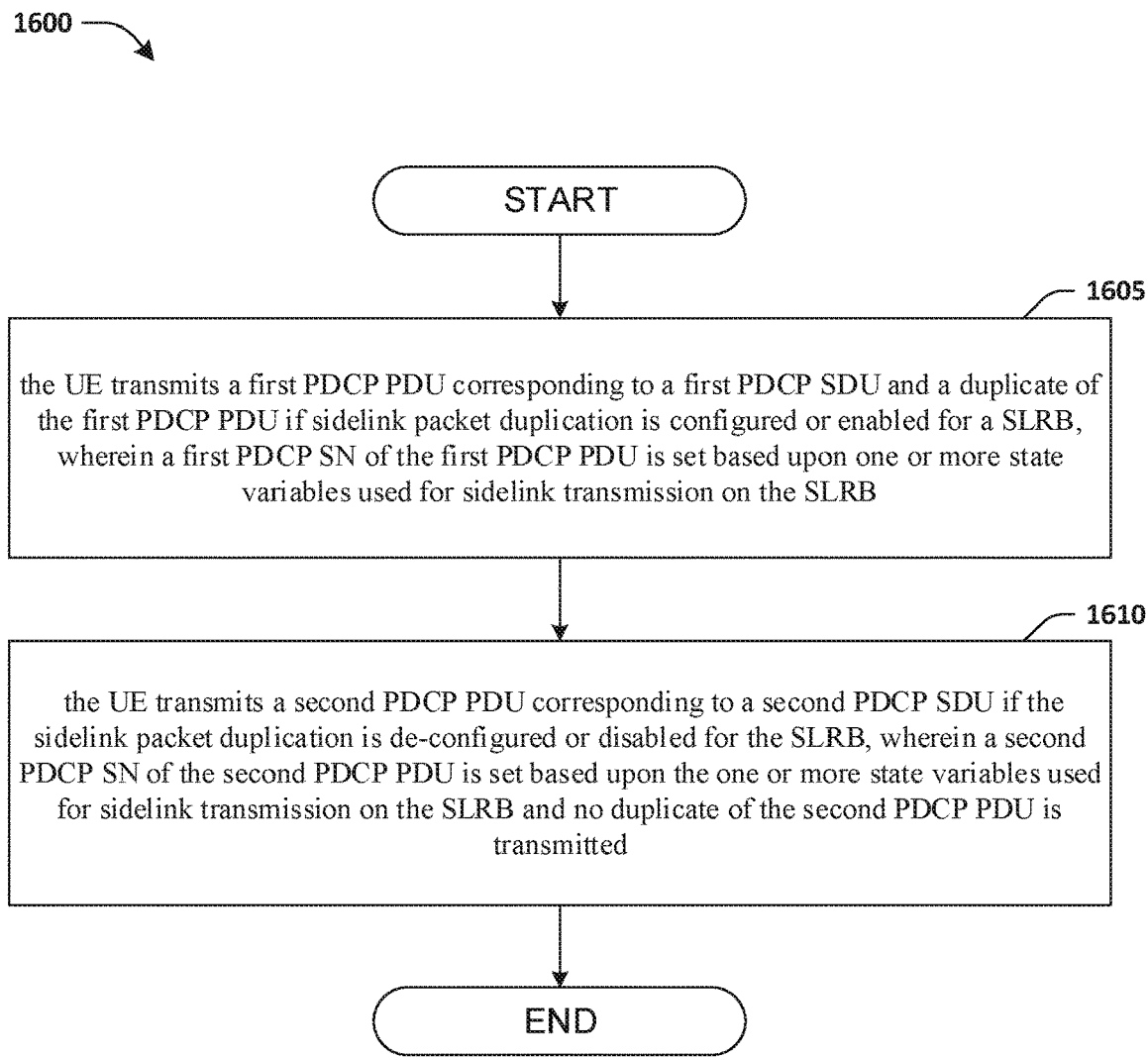
FIG. 16 is a flow chart according to one exemplary embodiment.

FIG. 16 is a flow chart 1600 according to one exemplary embodiment from the perspective of a UE for performing sidelink transmission. In step 1605, the UE transmits a first PDCP PDU corresponding to a first PDCP SDU and a duplicate of the first PDCP PDU if sidelink packet duplication is configured or enabled for a SLRB, wherein a first PDCP SN of the first PDCP PDU is set based upon one or more state variables used for sidelink transmission on the SLRB. In step 1610, the UE transmits a second PDCP PDU corresponding to a second PDCP SDU if the sidelink packet duplication is de-configured or disabled for the SLRB, wherein a second PDCP SN of the second PDCP PDU is set based upon the one or more state variables used for sidelink transmission on the SLRB and no duplicate of the second PDCP PDU is transmitted.

In one embodiment, the UE transmits the second PDCP PDU corresponding to the second PDCP SDU after the sidelink packet duplication is de-configured or disabled for the SLRB, wherein the second PDCP SN of the second PDCP PDU is set based upon the one or more state variables used for sidelink transmission on the SLRB and no duplicate of the second PDCP PDU is transmitted.

In one embodiment, the UE maintains the one or more state variables used for sidelink transmission on the SLRB if the sidelink packet duplication is configured or enabled for the SLRB.

In one embodiment, the UE continues maintaining the one or more state variables used for sidelink transmission on the SLRB after the sidelink packet duplication is de-configured or disabled for the SLRB.

In one embodiment, the one or more state variables used for sidelink transmission on the SLRB is a Next_PDCP_TX_SN and/or a TX_HFN.

In one embodiment, the one or more state variables used for sidelink transmission on the SLRB is not set to "0" if the sidelink packet duplication is de-configured or disabled.

In one embodiment, the sidelink packet duplication is configured or enabled if a threshSL-Reliability field of an SL-V2X-PacketDuplicationConfig in a system information is set to a value so that the UE is allowed to perform the sidelink transmission with sidelink packet duplication on the SLRB.

In one embodiment, the sidelink packet duplication is de-configured or disabled if threshSL-Reliability or SL-V2X-PacketDuplicationConfig is not provided in a system information or is removed from the system information so that the UE is not allowed to perform the sidelink transmission with sidelink packet duplication on the SLRB.

In one embodiment, the sidelink packet duplication is de-configured or disabled if a threshSL-Reliability field of an SL-V2X-PacketDuplicationConfig in a system information is changed to a value so that the UE is not allowed to perform the sidelink transmission with sidelink packet duplication on the SLRB.

In one embodiment, the first PDCP PDU and the duplicate of the first PDCP PDU is transmitted on two different carriers.

Referring back to FIGS. 3 and 4, in one exemplary embodiment of a UE, the device 300 includes a program code 312 stored in the memory 310. The CPU 308 could execute program code 312 to enable the UE (i) to transmit a first PDCP PDU corresponding to a first PDCP SDU and a duplicate of the first PDCP PDU if the sidelink packet duplication is configured or enabled for a SLRB, wherein a first PDCP SN of the first PDCP PDU is set based upon one or more state variables used for sidelink transmission on the SLRB, and (ii) to transmit a second PDCP PDU corresponding to a second PDCP SDU if the sidelink packet duplication is de-configured or disabled for the SLRB, wherein a second PDCP SN of the second PDCP PDU is set based upon the one or more state variables used for sidelink transmission on the SLRB and no duplicate of the second PDCP PDU is transmitted. Furthermore, the CPU 308 can execute the program code 312 to perform all of the above-described actions and steps or others described herein.

It may be appreciated that applying one or more of the techniques presented herein may result in one or more benefits including, but not limited to, a reduction in missing data due to de-configuring and/or disabling sidelink packet duplication.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in one or more of FIGS. 12-16. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) for performing sidelink transmission, comprising:
    determining whether sidelink packet duplication is (i) configured or enabled for a Sidelink Radio Bearer (SLRB) or (ii) de-configured or disabled for the SLRB according to information included in a system information block;
    if a determination is made that the sidelink packet duplication is configured or enabled for the SLRB, transmitting a first Packet Data Convergence Protocol (PDCP) Protocol Data Unit (PDU) corresponding to a first PDCP Service Data Unit (SDU) and a duplicate of the first PDCP PDU, wherein a first PDCP Sequence Number (SN) of the first PDCP PDU is set based upon one or more state variables used for sidelink transmission on the SLRB; and
    if a determination is made that the sidelink packet duplication is de-configured or disabled for the SLRB, transmitting a second PDCP PDU corresponding to a second PDCP SDU, wherein a second PDCP SN of the second PDCP PDU is set based upon the one or more state variables used for sidelink transmission on the SLRB and no duplicate of the second PDCP PDU is transmitted.

2. The method of claim 1, comprising:
    maintaining the one or more state variables used for sidelink transmission on the SLRB when the sidelink packet duplication is configured or enabled for the SLRB.

3. The method of claim 2, comprising:
    maintaining the one or more state variables used for sidelink transmission on the SLRB when the sidelink packet duplication is de-configured or disabled for the SLRB.

4. The method of claim 1, wherein a state variable of the one or more state variables used for sidelink transmission on the SLRB is a Next_PDCP_TX_SN.

5. The method of claim 1, wherein the second PDCP SN of the second PDCP PDU is not set to 0 when the sidelink packet duplication is de-configured or disabled for the SLRB.

6. The method of claim 4, wherein a second state variable of the one or more state variables used for sidelink transmission on the SLRB is a TX_HFN.

7. The method of claim 1, wherein the sidelink packet duplication is configured or enabled if a threshSL-Reliability field of an SL-V2X-PacketDuplicationConfig information element in a system information is set to a value enabling the UE to perform sidelink transmission with the sidelink packet duplication on the SLRB.

8. The method of claim 1, wherein the sidelink packet duplication is de-configured or disabled if at least one of the following is met:
    a threshSL-Reliability field of an SL-V2X-PacketDuplicationConfig information element is not provided to the UE via the system information block;
    the threshSL-Reliability field of the SL-V2X-PacketDuplicationConfig information element is removed from the system information block;
    the SL-V2X-PacketDuplicationConfig information element is not provided to the UE via the system information block; or
    the SL-V2X-PacketDuplicationConfig information element is removed from the system information block.

9. The method of claim 1, wherein the sidelink packet duplication is de-configured or disabled if a threshSL-Reliability field of an SL-V2X-PacketDuplicationConfig information element in the system information block is changed to a value disabling the UE from performing sidelink transmission with the sidelink packet duplication on the SLRB.

10. The method of claim 1, wherein:
    the first PDCP PDU is transmitted on a first carrier; and
    the duplicate of the first PDCP PDU is transmitted on a second carrier, different than the first carrier.

11. A communication device, comprising:
    a processor; and
    memory comprising processor-executable instructions that when executed by the processor cause performance of operations, the operations comprising:

determining whether sidelink packet duplication is (i) configured or enabled for a Sidelink Radio Bearer (SLRB) or (ii) de-configured or disabled for the SLRB according to information included in a system information block;

if a determination is made that the sidelink packet duplication is configured or enabled for the SLRB, transmitting a first Packet Data Convergence Protocol (PDCP) Protocol Data Unit (PDU) corresponding to a first PDCP Service Data Unit (SDU) and a duplicate of the first PDCP PDU, wherein a first PDCP Sequence Number (SN) of the first PDCP PDU is set based upon one or more state variables used for sidelink transmission on the SLRB; and if a determination is made that the sidelink packet duplication is de-configured or disabled for the SLRB, transmitting a second PDCP PDU corresponding to a second PDCP SDU, wherein a second PDCP SN of the second PDCP PDU is set based upon the one or more state variables used for sidelink transmission on the SLRB and no duplicate of the second PDCP PDU is transmitted.

12. The communication device of claim 11, the operations comprising:

maintaining the one or more state variables used for sidelink transmission on the SLRB when the sidelink packet duplication is configured or enabled for the SLRB.

13. The communication device of claim 12, the operations comprising:

maintaining the one or more state variables used for sidelink transmission on the SLRB when the sidelink packet duplication is de-configured or disabled for the SLRB.

14. The communication device of claim 11, wherein a state variable of the one or more state variables used for sidelink transmission on the SLRB is a Next_PDCP_TX_SN.

15. The communication device of claim 11, wherein the second PDCP SN of the second PDCP PDU is not set to 0 when the sidelink packet duplication is de-configured or disabled for the SLRB.

16. The communication device of claim 14, wherein a second state variable of the one or more state variables used for sidelink transmission on the SLRB is a TX_HFN.

17. The communication device of claim 11, wherein the sidelink packet duplication is configured or enabled if a threshSL-Reliability field of an SL-V2X-PacketDuplicationConfig information element in the system information block is set to a value enabling the communication device to perform sidelink transmission with the sidelink packet duplication on the SLRB.

18. The communication device of claim 11, wherein the sidelink packet duplication is de-configured or disabled if at least one of the following is met:

a threshSL-Reliability field of an SL-V2X-PacketDuplicationConfig information element is not provided to the communication device via the system information block;

the threshSL-Reliability field of the SL-V2X-PacketDuplicationConfig information element is removed from the system information block;

the SL-V2X-PacketDuplicationConfig information element is not provided to the communication device via the system information block; or the SL-V2X-PacketDuplicationConfig information element is removed from the system information block.

19. The communication device of claim 11, wherein the sidelink packet duplication is de-configured or disabled if a threshSL-Reliability field of an SL-V2X-PacketDuplicationConfig information element in the system information block is changed to a value disabling the communication device from performing sidelink transmission with the sidelink packet duplication on the SLRB.

20. The communication device of claim 11, wherein:

the first PDCP PDU is transmitted on a first carrier; and the duplicate of the first PDCP PDU is transmitted on a second carrier, different than the first carrier.

* * * * *